United States Patent
Watanabe et al.

(10) Patent No.: US 8,464,089 B2
(45) Date of Patent: Jun. 11, 2013

(54) TRACING APPARATUS AND TRACING SYSTEM

(75) Inventors: Kazuhiro Watanabe, Osaka (JP); Takashi Hashimoto, Hyogo (JP)

(73) Assignee: Panasonic Corporation, Osaka (JP)

(*) Notice: Subject to any disclaimer, the term of this patent is extended or adjusted under 35 U.S.C. 154(b) by 282 days.

(21) Appl. No.: 13/057,023

(22) PCT Filed: Jun. 3, 2010

(86) PCT No.: PCT/JP2010/003716
§ 371 (c)(1),
(2), (4) Date: Feb. 1, 2011

(87) PCT Pub. No.: WO2010/143381
PCT Pub. Date: Dec. 16, 2010

(65) Prior Publication Data
US 2011/0131442 A1 Jun. 2, 2011

(30) Foreign Application Priority Data
Jun. 10, 2009 (JP) .................................. 2009-138878

(51) Int. Cl.
| | |
|---|---|
| G06F 1/00 | (2006.01) |
| G06F 1/04 | (2006.01) |
| G06F 1/12 | (2006.01) |
| G06F 17/50 | (2006.01) |
| G06F 15/00 | (2006.01) |
| G06F 11/00 | (2006.01) |
| G06F 9/44 | (2006.01) |
| G01R 23/10 | (2006.01) |
| G01R 25/00 | (2006.01) |
| G01F 1/00 | (2006.01) |

(52) U.S. Cl.
USPC ........... 713/501; 713/375; 713/400; 713/500; 713/502; 702/78; 702/79; 702/176; 703/19; 712/23; 712/28; 714/45; 717/128

(58) Field of Classification Search
USPC .................. 713/375, 400, 500, 501; 702/78, 702/79, 176; 703/19; 712/23, 28; 714/45; 717/128
See application file for complete search history.

(56) References Cited

U.S. PATENT DOCUMENTS

| 5,805,867 A | 9/1998 | Kodaira | |
|---|---|---|---|
| 6,038,391 A * | 3/2000 | Kawaba | ........................ 703/21 |

(Continued)

FOREIGN PATENT DOCUMENTS

| JP | 1-102654 | 4/1989 |
|---|---|---|
| JP | 4-353939 | 12/1992 |

(Continued)

OTHER PUBLICATIONS

International Search Report issued Aug. 31, 2010 in International (PCT) Application No. PCT/JP2010/003716.

*Primary Examiner* — Stefan Stoynov
(74) *Attorney, Agent, or Firm* — Wenderoth, Lind & Ponack, L.L.P.

(57) ABSTRACT

A tracing apparatus for tracing operational information that is output from a plurality of processing units in relation to data processing operations, the tracing apparatus comprising for each of the processing units: a counting unit configured to obtain and output a counter value for the corresponding processing unit, the counter value obtained by counting clock signals that are input to the processing unit at an operating frequency thereof; a counter value conversion unit configured to obtain and output a converted counter value for the corresponding processing unit, the converted counter value obtained by converting the counter value based on the assumption that the processing unit has a given reference operating frequency; and an adding unit configured to acquire an operational information set from the corresponding processing unit, and to add the converted counter value to the operational information set.

15 Claims, 17 Drawing Sheets

U.S. PATENT DOCUMENTS

| | | |
|---|---|---|
| 6,230,313 B1 * | 5/2001 | Callahan et al. ............... 717/128 |
| 7,065,641 B2 * | 6/2006 | Schelling .......................... 713/2 |
| 7,564,809 B1 * | 7/2009 | Manohar et al. .............. 370/310 |
| 2002/0019951 A1 | 2/2002 | Kubo et al. |
| 2005/0033553 A1 | 2/2005 | Swaine et al. |

FOREIGN PATENT DOCUMENTS

| | | |
|---|---|---|
| JP | 7-281925 | 10/1995 |
| JP | 8-137572 | 5/1996 |
| JP | 2000-348007 | 12/2000 |
| JP | 2002-49605 | 2/2002 |
| JP | 2004-258705 | 9/2004 |
| JP | 2005-56380 | 3/2005 |
| JP | 2009-54107 | 3/2009 |

* cited by examiner

FIG. 3

| | |
|---|---|
| 3001 | 3002 |
| Processing unit 301a | 100MHz |
| Processing unit 301b | 200MHz |
| Processing unit 301c | 400MHz |

FIG. 5

| Converted counter value #m |
|---|
| The number of processing cycles |
| The number of executed instructions |
| The number of executed calculations |
| Cache memory hit rate |
| Executed instruction A |
| ... |
| Executed instruction N |
| ... |
| Access address A |
| ... |
| Access address N |
| ... |
| Converted counter value #m+1 |
| The number of processing cycles |
| The number of executed instructions |
| The number of executed calculations |
| Cache memory hit rate |
| Executed instruction A |
| ... |
| Executed instruction N |
| ... |
| Access address A |
| ... |
| Access address N |
| ... |
| ... |

Instruction sequence history (Executed instruction A ... Executed instruction N)

Address sequence history (Access address A ... Access address N)

FIG. 7A

Operational information of processing unit 301a

| Converted counter value #L |
|---|
| The number of processing cycles |
| The number of executed instructions |
| The number of executed calculations |
| Cache memory hit rate |
| Converted counter value #M |
| The number of processing cycles |
| The number of executed instructions |
| The number of executed calculations |
| Cache memory hit rate |
| ... |

Operational information of processing unit 301b

| Converted counter value #M |
|---|
| The number of processing cycles |
| The number of executed instructions |
| The number of executed calculations |
| Cache memory hit rate |
| Converted counter value #N |
| The number of processing cycles |
| The number of executed instructions |
| The number of executed calculations |
| Cache memory hit rate |
| ... |

Operational information of processing unit 301c

| Converted counter value #L |
|---|
| The number of processing cycles |
| The number of executed instructions |
| The number of executed calculations |
| Cache memory hit rate |
| Converted counter value #M |
| The number of processing cycles |
| The number of executed instructions |
| The number of executed calculations |
| Cache memory hit rate |
| ... |

FIG. 7B

Operational information with converted counter value #L

| Processing unit 301a |
|---|
| The number of processing cycles |
| The number of executed instructions |
| The number of executed calculations |
| Cache memory hit rate |
| Processing unit 301c |
| The number of processing cycles |
| The number of executed instructions |
| The number of executed calculations |
| Cache memory hit rate |
| ... |

Operational information with converted counter value #M

| Processing unit 301a |
|---|
| The number of processing cycles |
| The number of executed instructions |
| The number of executed calculations |
| Cache memory hit rate |
| Processing unit 301b |
| The number of processing cycles |
| The number of executed instructions |
| The number of executed calculations |
| Cache memory hit rate |
| Processing unit 301c |
| The number of processing cycles |
| The number of executed instructions |
| The number of executed calculations |
| Cache memory hit rate |
| ... |

Operational information with converted counter value #N

| Processing unit 301b |
|---|
| The number of processing cycles |
| The number of executed instructions |
| The number of executed calculations |
| Cache memory hit rate |
| ... |

FIG. 8
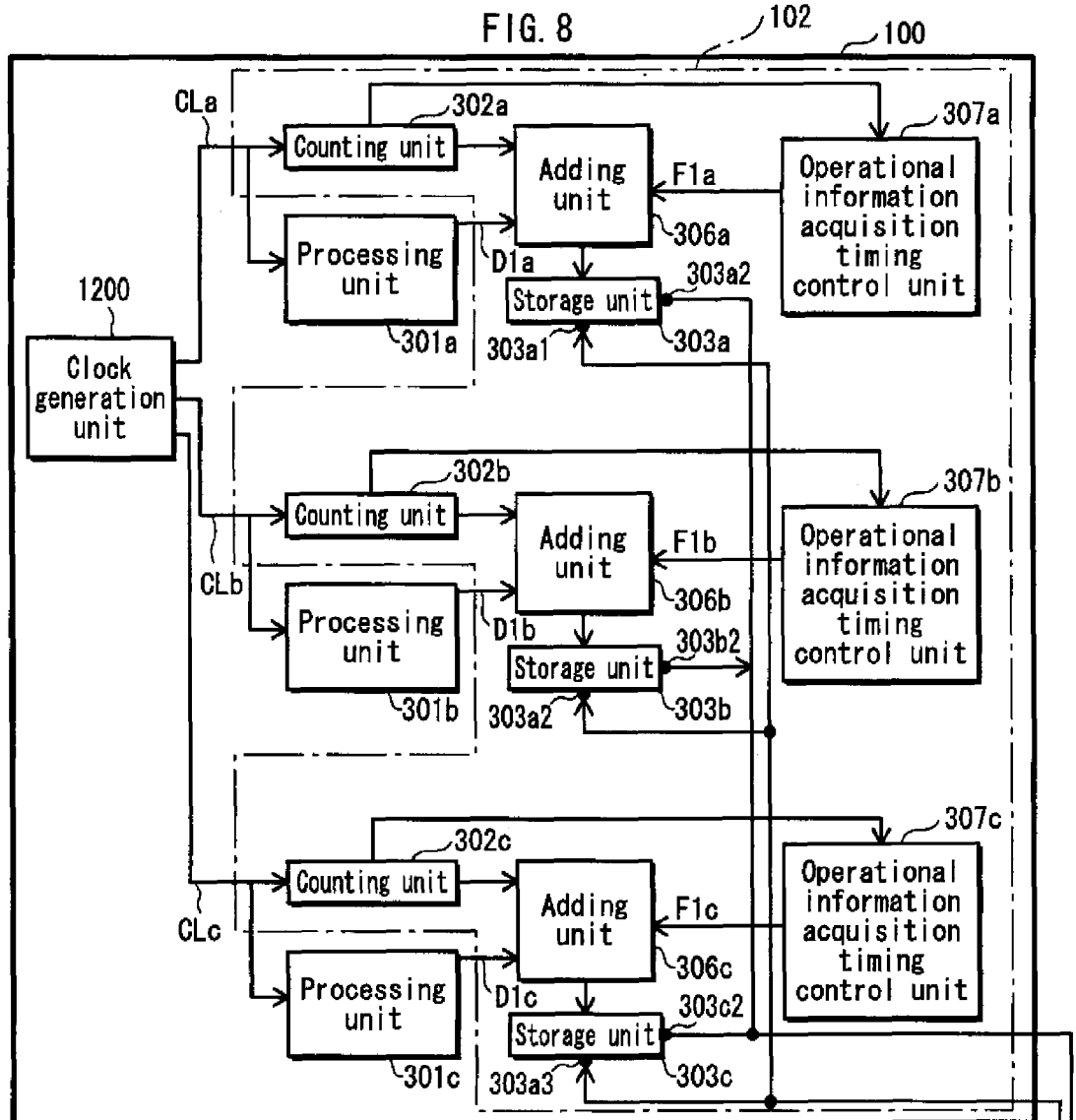
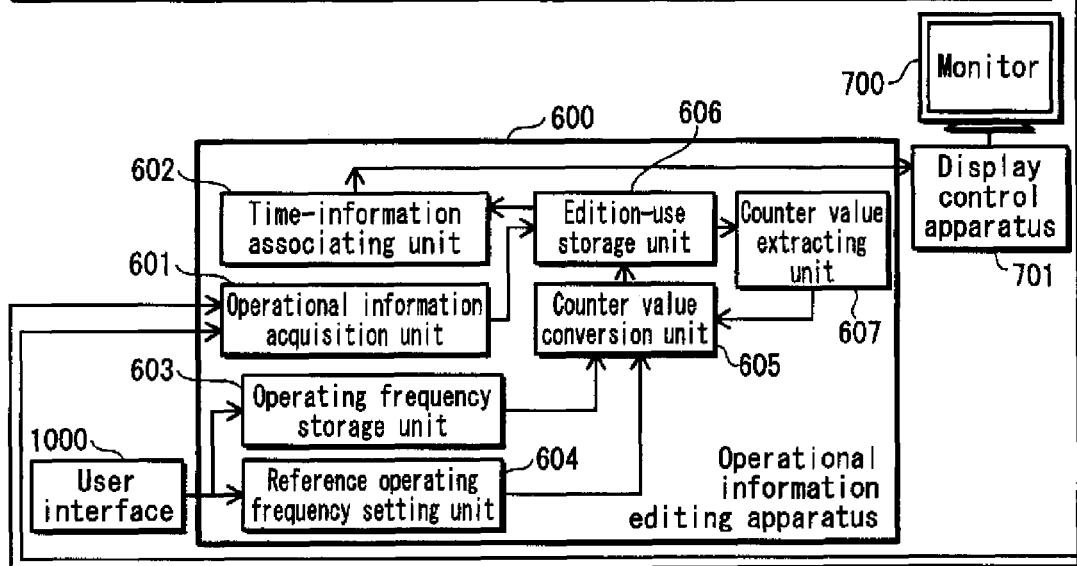

FIG. 9

| Counter value #m |
|---|
| The number of processing cycles |
| The number of executed instructions |
| The number of executed calculations |
| Cache memory hit rate |
| Executed instruction A |
| ... |
| Executed instruction N |
| ... |
| Access address A |
| ... |
| Access address N |
| ... |
| Counter value #m+1 |
| The number of processing cycles |
| The number of executed instructions |
| The number of executed calculations |
| Cache memory hit rate |
| Executed instruction A |
| ... |
| Executed instruction N |
| ... |
| Access address A |
| ... |
| Access address N |
| ... |
| ... |

- Executed instruction A ... Executed instruction N: Instruction sequence history
- Access address A ... Access address N: Address sequence history Operating frequency information from operating frequency control unit Operating frequency information from operating frequency control unit

FIG. 13

| | | |
|---|---|---|
| Converted counter value #m+1 | The number of processing cycles | |
| Converted counter value #m+2 | The number of executed instructions | |
| Converted counter value #m+3 | The number of executed calculations | |
| Converted counter value #m+4 | Cache memory hit rate | |
| Converted counter value #m+5 | Executed instruction A | ⎫ |
| ... | ... | ⎬ Instruction sequence history |
| ... | ... | |
| Converted counter value #m+N | Executed instruction N | ⎭ |
| Converted counter value #m+N+1 | Access address A | ⎫ |
| Converted counter value #m+N+2 | ... | ⎬ Address sequence history |
| ... | ... | |
| Converted counter value #m+2N | Access address N | ⎭ |
| Converted counter value #n+1 | The number of processing cycles | |
| Converted counter value #n+2 | The number of executed instructions | |
| Converted counter value #n+3 | The number of executed calculations | |
| Converted counter value #n+4 | Cache memory hit rate | |
| Converted counter value #n+5 | Executed instruction A | |
| ... | ... | |
| ... | ... | |
| Converted counter value #n+N | Executed instruction N | |
| Converted counter value #n+N+1 | Access address A | |
| Converted counter value #n+N+2 | ... | |
| ... | ... | |
| Converted counter value #n+2N | Access address N | |
| ... | ... | |

FIG. 14

| | | |
|---|---|---|
| Counter value #m+1 | The number of processing cycles | |
| Counter value #m+2 | The number of executed instructions | |
| Counter value #m+3 | The number of executed calculations | |
| Counter value #m+4 | Cache memory hit rate | |
| Counter value #m+5 | Executed instruction A | ⎫ |
| ... | ... | ⎬ Instruction sequence history |
| ... | ... | |
| Counter value #m+N | Executed instruction N | ⎭ |
| Counter value #m+N+1 | Access address A | ⎫ |
| Counter value #m+N+2 | ... | ⎬ Address sequence history |
| ... | ... | |
| Counter value #m+2N | Access address N | ⎭ |
| Counter value #n+1 | The number of processing cycles | |
| Counter value #n+2 | The number of executed instructions | |
| Counter value #n+3 | The number of executed calculations | |
| Counter value #n+4 | Cache memory hit rate | |
| Counter value #n+5 | Executed instruction A | |
| ... | ... | |
| ... | ... | |
| Counter value #n+N | Executed instruction N | |
| Counter value #n+N+1 | Access address A | |
| Counter value #n+N+2 | ... | |
| ... | ... | |
| Counter value #n+2N | Access address N | |
| ... | ... | |

FIG. 15

| Converted counter value #n+1 | The number of processing cycles | Operating frequency | Operating voltage |
|---|---|---|---|
| Converted counter value #n+2 | The number of executed instructions | Operating frequency | Operating voltage |
| Converted counter value #n+3 | The number of executed calculations | Operating frequency | Operating voltage |
| Converted counter value #n+4 | Cache memory hit rate | Operating frequency | Operating voltage |
| Converted counter value #n+5 | Executed instruction A | Operating frequency | Operating voltage |
| ... | ... | Operating frequency | Operating voltage |
| Converted counter value #n+N | Executed instruction N | Operating frequency | Operating voltage |
| Converted counter value #n+N+1 | Access address A | Operating frequency | Operating voltage |
| ... | ... | Operating frequency | Operating voltage |
| Converted counter value #n+2N | Access address N | Operating frequency | Operating voltage |
| ... | ... | Operating frequency | Operating voltage |

TRACING APPARATUS AND TRACING SYSTEM

TECHNICAL FIELD

The present invention relates to a tracing apparatus for performing tracing on a parallel processing apparatus including a plurality of processing units, and to a tracing system including such a tracing apparatus.

BACKGROUND ART

In recent years, the use of parallel processing apparatuses has become common. Specifically, a parallel processing apparatus includes a plurality of processing units, such as a plurality of CPU cores of a multi-core processor, and a plurality of processors of a multiprocessor.

In such a parallel processing apparatus, it is sometimes necessary to perform tracing (i.e. to trace records of the operations performed by the processing units) on each of the processing units, in order to conduct performance analysis, such as measuring of the processing loads thereon, and behavioral analysis, such as measuring of memory accesses and cache hit rates. In such cases, it is necessary to keep the temporal consistency among the results of the tracing performed on the processing units. In other words, it is sometimes necessary to obtain the tracing results for the processing units with reference to the same timeline.

In view of this necessity, Patent Literature 1 proposes a timer adjustment system. This system is used with a parallel processing apparatus (i.e., multiprocessor system) including a plurality of processing units each having a timer, and aims to prevent errors among the values obtained by the respective timers of the processing units. For this purpose, a generation unit for generating a time synchronization signal is provided in the system, and the generation unit generates and sends a time synchronization signal to each processing unit. Each processing unit adjusts the value obtained by its timer, based on the time synchronization signal.

FIG. 16 is a block diagram of the timer adjustment system disclosed in Patent Literature 1.

As shown in FIG. 16, the timer adjustment system disclosed in Patent Literature 1 includes a generation unit 1611, an output unit 1612, a distribution unit 1616, and an input unit 1613. The generation unit 1611 generates time synchronization signals. The output unit 1612 is for outputting the time synchronization signals transferred from the generation unit 1611 to all the processing units. The distribution unit 1616 distributes the time synchronization signals output from the output unit 1612 to each of the processing units. The input unit 1613 receives the time synchronization signals that have been output by the output unit 1612, distributed by the distribution unit 1616 and returned to the input unit 1613. The timer adjustment system shown in FIG. 16 is also provided with a measuring unit 1614 and a synchronization unit 1615. The measuring unit 1614 measures the time (hereinafter called "propagation time") from when a time synchronization signal is output form the output unit 1612 to when the signal returns to the input unit 1613 via the parallel processing apparatus including the processing units. The synchronization unit 1615 corrects the errors of the values obtained by the timers, based on the propagation time measured by the measuring unit 1614.

With use of the timer adjustment system shown in FIG. 16, if the operating frequencies of the processing units constituting the multiprocessor system are the same, it is possible to perform the tracing for the processing units with reference to the same timeline, by matching the values held by the timers of the processing units with each other at a predetermined time point.

With the timer adjustment system shown in FIG. 16, however, if the operating frequencies of the processing units in the parallel processing apparatus are not the same, it is impossible to perform the tracing for the processing units with reference to the same timeline. This is because it is impossible to match the values held by the timers of the processing units without consideration of the relationship between the operating frequency of each processing unit and the propagation delay time.

In view of this problem, a simulation apparatus for realizing tracing on a plurality of processors with reference to the same timeline has been proposed (Patent Literature 2). In this system, each processor is provided each other with a common signal, together with a clock signal with a different operating frequency. The system captures the common signal and phase information pieces of the processors, which are exchanged among the processors, together with the execution results of the processors. The system synchronizes the execution results based on the common signal and the phase information pieces.

Application of the technology disclosed in Patent Literature 2 realizes the tracing with reference to the same timeline, even if each processing unit operates at a clock signal with a different operating frequency. That is, by providing each processing unit with a counter that outputs a different value depending on the operation clock, and correcting the output values from the counters by using the common signal so as to incorporate the pieces of phase information (i.e., time information) into the output values, the technology realizes the tracing with reference to the same timeline indicated by each counter.

There also is a conventional method for obtaining a trace information piece for each of the processors (i.e., processing units) included in a computer system structured on a simulator apparatus (See Patent Literature 3).

According to this method, each processor performs processing in synchronization with the clock individually provided therein, and gives its operational information piece to the other processors in real time, and combines and holds its operational information piece and the operational information pieces of the other processors. Each processor compares its operational information piece contained in the trace information piece held therein with operational information pieces contained in the trace information pieces held in the other processors, and keeps the consistency among the trace information pieces held by the processors, in terms of time.

In a simulator apparatus using the trace information acquisition method, a plurality of processors, a trace editing unit 1720, and a display unit 1721 are structured on the simulator apparatus, as shown in FIG. 17. In the example shown in FIG. 17, there are two processors, namely processors 1701 and 1711. The trace editing unit 1720 edits trace information pieces 1709 and 1719 output from the processors 1701 and 1711, respectively. The display unit 1721 displays the trace information pieces edited by the trace editing unit 1720.

The processors 1701 and 1711 include instruction execution simulators 1704 and 1714, transmitters 1707 and 1717, receivers 1706 and 1716, and tracing units 1702 and 1712, respectively. The instruction execution simulators 1704 and 1714 execute programs 1705 and 1715 under test, respectively. The transmitters 1707 and 1717 transmit the operational information pieces, resulting from the execution of the programs 1705 and 1715 under test on the instruction execution simulators 1704 and 1714, to the processors 1711 and 1701, respectively, via a communication unit 1710. The receivers 1706 and 1716 receive the operational information pieces from the transmitters 1707 and 1717, respectively, via the communication unit 1710. The tracing units 1702 and 1712 trace the operational information pieces received by the receivers 1706 and 1716 by using clocks 1703 and 1713, respectively.

The trace editing unit 1720 shown in FIG. 17 compares the operational information pieces contained in the trace information pieces of the processors 1701 and 1711 with each other. Thus, at the location where the operational information piece of the processor 1701, which is contained in the trace information piece held by the processor 1711, matches the operational information piece contained in the trace information piece held by the processor 1701 itself, the trace editing unit 1720 interfaces with the trace information piece held in the processor 1701 and the trace information piece held in the processor 1711 consistent in terms of time.

In some cases, the pieces of trace information contain identical or similar operational information pieces. If this is the case, it can be difficult to specify the operational information piece that is to be used as reference information. In view of this, the trace information acquisition method shown in FIG. 17 uses random number generators 1708 and 1718 each adding a random number to the operational information piece contained in the corresponding trace information piece. This structure distinguishes the identical or similar operational information pieces from each other.

CITATION LIST

Patent Literature

[Patent Literature 1] Japanese Patent Application Publication No. 2002-49605
[Patent Literature 2] Japanese Patent Application Publication No. 2009-54107
[Patent Literature 3] Japanese Patent Application Publication No. 4-353939

SUMMARY OF INVENTION

Technical Problem

However, if the technology disclosed in the Patent Literature 2 is actually applied to a tracing apparatus for a parallel processing apparatus, it is necessary to add, to each of the processing units in the tracing apparatus, a timer clock system, besides the operation clock system. Also, it is necessary to add, to each processing unit, at least two counters, including one that is capable of correcting its counter value by taking the phase information of the corresponding processing unit into account, based on the timer clock system. This leads to a complicated layout, which possibly makes the manufacturing of the apparatus difficult.

In particular, in the case of realizing such a tracing apparatus on a LSI (Large Scale Integration), the complicated layout makes the manufacturing of the apparatus even more difficult. Moreover, it might increase the size of the LSI.

In addition, along with the recent progress of semiconductor microfabrication technique and processor design technique, the gate length is now on the order of 32 nm, and the operating frequency of a microprocessor is now on the order of over 1 GHz. Thus, it is difficult to control the signal propagation delays and variations in the LSI. Accordingly, even if an additional clock system for the timers, besides the clock system for the operations, and at least two counters are provided as in the case with the tracing apparatus that applies the technology disclosed in Patent Literature 2, the times elapsed before the common clock signal reaches the processing units might be different from each other, and it might be difficult to perform the tracing with reference to the same timeline.

In the case of applying the technology disclosed in Patent Literature 3 to a tracing apparatus for an actual parallel processing apparatus, it is unnecessary to additionally provide a clock system for the timer, for each of the processing units, besides the clock system for the operations. However, it is necessary to provide lines for exchanging the operational information pieces among the processing units. Thus, the complicated layout of the tracing apparatus might make the manufacturing of the apparatus difficult.

The present invention is made in view of the problems described above. An object of the present invention is to provide a tracing apparatus that has a simple layout but is capable of performing tracing on a plurality of processing units with reference to the same timeline even though the processing units operate with different operating frequencies.

Solution to Problem

To solve the problems described above, the present invention provides a tracing apparatus for tracing operational information that is output from a plurality of processing units in relation to data processing operations, the tracing apparatus comprising for each of the processing units: a counting unit configured to obtain and output a counter value for the corresponding processing unit, the counter value obtained by counting clock signals that are input to the processing unit at an operating frequency thereof; a counter value conversion unit configured to obtain and output a converted counter value for the corresponding processing unit, the converted counter value obtained by converting the counter value based on the assumption that the processing unit has a given reference operating frequency; and an adding unit configured to acquire an operational information set from the corresponding processing unit, and to add the converted counter value to the operational information set.

Advantageous Effects of Invention

With the stated structure, in the case of performing tracing on a plurality of processing units that each outputs operational information sets relating to operations executed in data processing, the tracing apparatus is capable of performing the tracing on the plurality of processing units with reference to the same timeline, by adding the converted counter value, which has been converted from the counter value on the assumption that the processing unit has a given reference operating frequency, to the operational information set from each processing unit. This makes it easy to conduct time-series analysis on the performance and the operations of each processing unit. Also, it is unnecessary to provide the apparatus with an additional common clock system for outputting common clock signals to the processing units besides the clock system for the operations, because the counter values are converted to the converted counter values which have been converted from the counter values on the assumption that the processing units have a given reference operating frequency. Moreover, it is unnecessary to provide with wirings for exchanging the operational information sets between the processing units. Thus, the structure has advantages for layout simplification, particularly in the case where the tracing apparatus is embodied as an integrated circuit.

The tracing apparatus may further comprise a counting control unit configured to control each of the counting units such that the counting units start counting the clock signals at the same time.

With the stated structure, the counting control unit forces the counters to start the counting at the same time. Thus, the tracing apparatus is capable of maintaining the temporal order among the results of the tracing, obtained from each of the processing units.

The tracing apparatus may further comprise an operating frequency storage unit configured to store operating frequencies of the processing units, wherein each of the counter value conversion units may acquire an operating frequency of the corresponding processing unit from the operating frequency storage unit.

With the stated structure, due to the operating frequency storage unit configured to store the operating frequencies of the processing units, the tracing apparatus is capable of performing the tracing on the processing units with reference to the same timeline, simply by storing the operating frequencies of the processing units into the operating frequency storage unit. Thus, even in the case where the operating frequency of any of the processing units is changed, it is possible to change the operating frequency that is to be set to the counter value conversion unit, simply by updating the operating frequencies stored in the operating frequency storage unit.

If the operating frequency storage unit is provided inside the parallel processing apparatus, it is unnecessary for the counter value conversion unit to acquire the operating frequencies from the outside of the apparatus. Thus, the parallel processing apparatus does not require input pins for acquiring the operating frequencies. This means that the number of processing units to be provided in the parallel processing apparatus is not limited to the number of the input/output pins.

The tracing apparatus may further comprise: a reference operating frequency setting unit configured to set the reference operating frequency to each of the counter value conversion units, wherein each of the counter value conversion units may obtain the converted counter value by using the operating frequency of the corresponding processing unit and the reference operating frequency.

With the stated structure, the reference operating frequency setting unit makes it possible to change the reference operating frequency flexibly. Thus, it is possible to select an optimum reference operating frequency according to the operating frequencies of the processing units.

In the tracing apparatus, the reference operating frequency setting unit may select one from among the operating frequencies of the processing units as the reference operating frequency.

With the stated structure, the reference operating frequency setting unit automatically selects one from among the operating frequencies of the processing units, as the reference operating frequency. Thus, it is unnecessary for the user to designate a reference operating frequency to be set to the reference operating frequency setting unit. This reduces the burden of maintenance by the user.

In the tracing apparatus, each of the counter value conversion units may obtain the converted counter value by multiplying the counter value by a conversion coefficient obtained by dividing the reference operating frequency by the operating frequency of the corresponding processing unit.

With the stated structure, it is easy to obtain the converted counter value by simple calculations using the given reference operating frequency and the operating frequencies of the processing units. Thus, it is possible to embody the counter value conversion unit with a simple computing circuit.

The tracing apparatus may further comprise an operating frequency changing unit configured to update the operating frequencies in the operating frequency storage unit when the operating frequency of any of the processing units is changed.

With the stated structure, even in the case of a parallel processing apparatus in which the operating frequencies of the processing units are dynamically changed by the operating frequency control unit that controls the operating frequencies, the tracing apparatus is capable of performing the tracing on each of the processing units with reference to the same timeline. This makes it easy to conduct time-series analysis on the performance and the operations of each processing unit.

In the tracing apparatus, each of the adding units adds the operating frequency of the corresponding processing unit to the operational information set together with the converted counter value.

With the stated structure, the operating frequency is added to each operational information set so that the user is allowed to follow the change history of the operating frequency. This allows the user to conduct time-series analysis on the performance and the operations of each processing unit from a broader perspective.

The tracing apparatus may further comprise a storage unit configured to store each of the operational information sets with the corresponding converted counter value added.

With the stated structure, the storage unit temporarily stores the operational information sets, and the timing of reading the operational information sets from the storage unit can be flexibly determined. This improves the design flexibility. Also, since the timing of reading the operational information sets from the storage unit can be flexibly determined, it may be possible to reduce the frequency of input/output operations required for performing the tracing between the parallel processing apparatus and the external apparatus, depending on the timing.

Another aspect of the present invention is an integrated circuit including a plurality of processing circuits that each output operational information sets relating to data processing operations, the integrated circuit comprising for each of the processing circuits: a counter circuit configured to obtain and output a counter value for the corresponding processing circuit, the counter value obtained by counting clock signals that are input to the processing circuit at an operating frequency thereof; a counter value conversion circuit configured to obtain and output a converted counter value for the corresponding processing circuit, the converted counter value obtained by converting the counter value based on the assumption that the processing circuit has a given reference operating frequency; and an adding circuit configured to acquire an operational information set from the corresponding processing circuit, and add the converted counter value to the operational information set.

With the stated structure, the parallel processing apparatus and the tracing apparatus are realized with a single integrated circuit, which contributes to downsizing.

Another aspect of the present invention is a tracing system that includes a tracing apparatus and an operational information editing apparatus, and traces operational information that is output from a plurality of processing units in relation to data processing operations, the tracing apparatus comprising for each of the processing units: a counting unit configured to obtain and output counter values for the corresponding processing unit, the counter values obtained by counting clock signals that are input to the processing unit at an operating frequency thereof; a counter value conversion unit configured to obtain and output converted counter values for the corresponding processing unit, the converted counter values obtained by converting the counter values based on the assumption that the processing unit has a given reference operating frequency; and an adding unit configured to acquire operational information sets from the corresponding processing unit, and add the converted counter values to the operational information sets on a one-to-one basis, and the editing apparatus comprising: an operational information acquiring unit configured to acquire data containing the operational information sets and the converted counter values from the tracing apparatus; and a time-information associating unit configured to associate, for each of the processing units, the operational information sets with the converted counter values by using the converted counter values as time points at which the corresponding processing unit acquires the operational information sets, and to sort, for each of the processing units, the operational information sets in the order of the converted counter values.

With the stated structure, the operational information acquisition unit is capable of taking out the operational information sets from the tracing apparatus. Thus, the tracing system is capable of acquiring the operational information sets by using, for example, an external computer, and editing the operational information sets flexibly.

Another aspect of the present invention is a tracing system that includes a tracing apparatus and an operational information editing apparatus, and traces operational information that is output from a plurality of processing units in relation to data processing operations, the tracing apparatus comprising for each of the processing units: a counting unit configured to obtain and output counter values for the corresponding processing unit, the counter values obtained by counting clock signals that are input to the processing unit at an operating frequency thereof; and an adding unit configured to acquire an operational information set from the corresponding processing unit each time the counting unit outputs a counter value, and add the counter values to the acquired operational information sets on a one-to-one basis, and the editing apparatus comprising: an operational information acquiring unit configured to acquire data containing the operational information sets and the counter values from the tracing apparatus; a counter value extracting unit configured to extract the counter values for each of the processing units, from the data acquired by the operational information acquiring unit; a counter value conversion unit configured to obtain and output converted counter values for each of the processing units, each converted counter value obtained by converting the corresponding counter value based on the assumption that the processing unit has a given reference operating frequency; and a time-information associating unit configured to associate, for each of the processing units, the operational information sets with the converted counter values by using the converted counter values as time points at which the corresponding processing unit acquires the operational information sets, and to sort, for each of the processing units, the operational information sets in the order of the converted counter values.

According to the stated structure, the counter value conversion unit is provided outside the parallel processing apparatus. Thus, the tracing system is capable of performing the tracing on the processing units even in the case of a tracing apparatus that includes the counting unit, the adding unit and the storage unit, by the simple connection of the operational information editing apparatus to the tracing apparatus. This makes it easy to conduct time-series analysis on the performance and the operations of each processing unit.

Another aspect of the present invention is a tracing method for tracing operational information that is output from a plurality of processing units in relation to data processing operations, the tracing method comprising, for each of the processing units, the steps of: obtaining and outputting a counter value for the corresponding processing unit, the counter value obtained by counting clock signals that are input to the processing unit at an operating frequency thereof; obtaining and outputting a converted counter value for the corresponding processing unit, the converted counter value obtained by converting the counter value based on the assumption that the processing unit has a given reference operating frequency; and acquiring an operational information set from the corresponding processing unit, and adding the converted counter value to the operational information set.

With the stated structure, in the case of performing tracing on a plurality of processing units that each output operational information sets relating to operations executed in data processing, the tracing apparatus is capable of performing the tracing on the plurality of processing units with reference to the same timeline, by adding the converted counter value, which has been converted from the counter value on the assumption that the processing unit has a given reference operating frequency, to the operational information set from each processing unit. This makes it easy to conduct time-series analysis on the performance and the operations of each processing unit. Also, it is unnecessary to provide the apparatus with an additional common clock system for outputting common clock signals to the processing units besides the clock system for the operations, because the counter values are converted to the converted counter values which have been converted from the counter values on the assumption that the processing units have a given reference operating frequency. Moreover, it is unnecessary to provide with wirings for exchanging the operational information sets between the processing units. Thus, the structure is advantages for layout simplification, particularly in the case where the tracing apparatus is embodied as an integrated circuit.

BRIEF DESCRIPTION OF DRAWINGS

FIG. 3 is a conceptual diagram of an operating frequency management table pertaining to Embodiment 1.

FIG. 5 is a conceptual diagram of data that contains operational information to which converted counter values have been added by an adding unit pertaining to Embodiment 1.

FIG. 7A and FIG. 7B illustrate times and operational information pieces associated with each other by a time-information associating unit pertaining to Embodiment 2.

FIG. 8 is a block diagram showing the structure of a tracing system pertaining to Embodiment 3.

FIG. 9 is a conceptual diagram of data that contains operational information to which counter values have been added by an adding unit pertaining to Embodiment 3.

FIG. 13 is a conceptual diagram of data that contains operational information to which converted counter values have been added by an adding unit pertaining to Modification.

FIG. 14 is a conceptual diagram of data that contains operational information to which converted counter values have been added by an adding unit pertaining to Modification.

FIG. 15 is a conceptual diagram of data that contains operational information to which converted counter values, operating frequencies and operating voltages have been added by an adding unit pertaining to Modification.

DESCRIPTION OF EMBODIMENTS

Embodiment 1

<1> Structure

Figure 1:
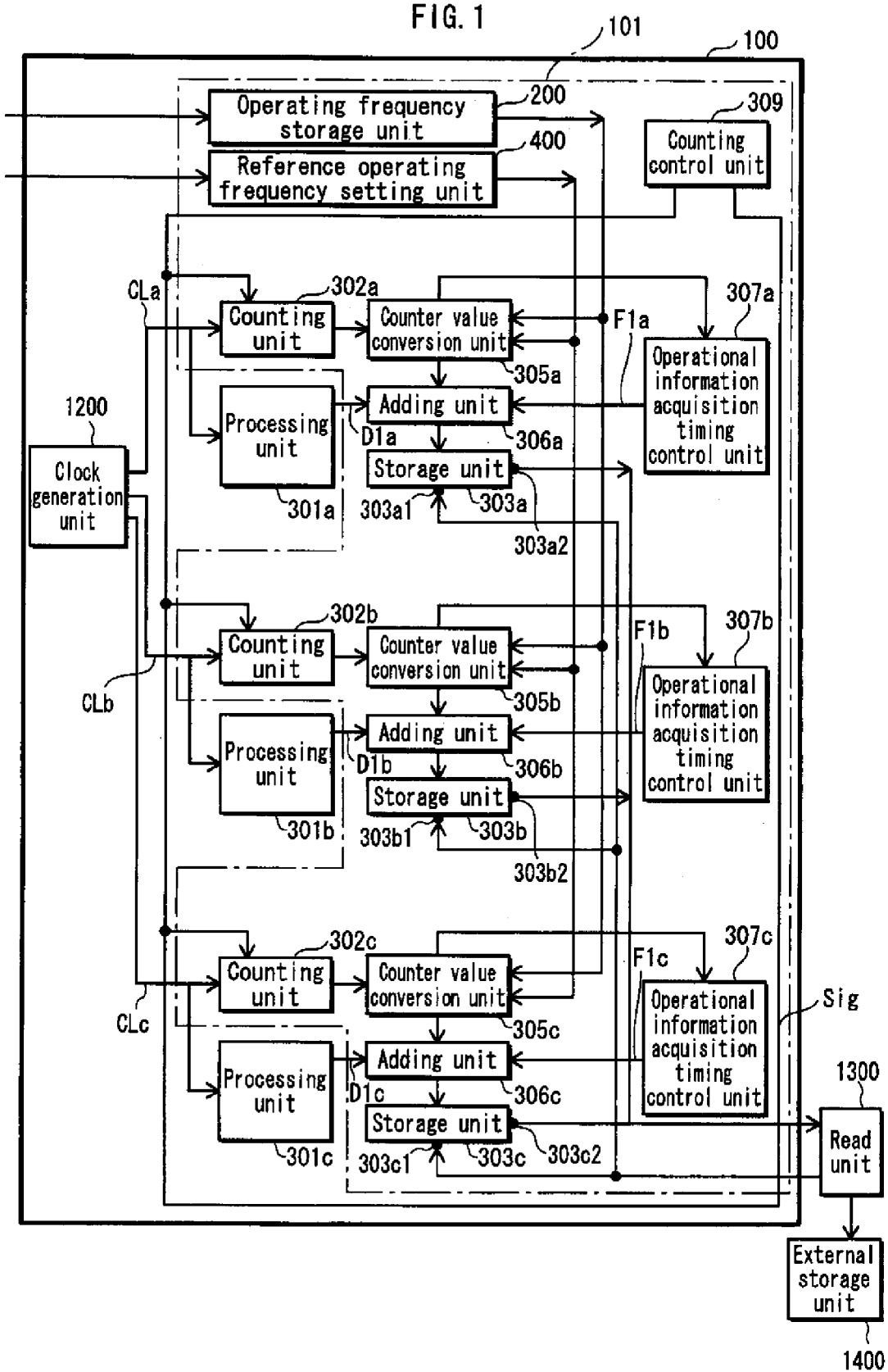
FIG. 1 is a block diagram showing the structure of a tracing apparatus pertaining to Embodiment 1.

FIG. 1 is a block diagram showing the structure of a tracing apparatus 101 pertaining to this embodiment.

As shown in FIG. 1, the tracing apparatus 101 pertaining to this embodiment performs tracing on a parallel processing apparatus 100. The parallel processing apparatus 100 includes three processing units, namely processing units 301a, 301b and 301c. The processing units 301a, 301b and 301c perform data processing based on clock signals CLa, CLb and CLc respectively, which are provided from a clock generation unit 1200. Also, the processing units 301a, 301b and 301c output operational information pieces D1a, D1b and D1c respectively, which relate to operations performed in the data processing. The processing units 301a, 301b and 301c operate with different operating frequencies. Note that each of the processing units 301a, 301b and 301c consists of a CPU core, a processor, or the like. The clock generation unit 1200 consists of a frequency synthesizer, for example.

Each of the operational information pieces D1a, D1b and D1c includes, for example, the number of processing cycles performed by the corresponding processing unit, 301a, 301b or 301c, the number of executed instructions, the number of executed calculations, a cache memory hit rate and a cache memory miss rate, and operation rates of calculation resources for the processing unit (e.g., the time lengths of calculations and operations performed by the processing unit, the number of accesses to the cache memory, etc). The operational information pieces D1a, D1b and D1c are not limited to those listed above. Each operational information piece may include, for example, a type of an executed instruction, history of calculation, and memory access history represented by memory addresses.

The tracing apparatus 101 pertaining to this embodiment includes counting units 302a, 302b and 302c, counter value conversion units 305a, 305b and 305c, adding units 306a, 306b and 306c, a counting control unit 309, storage units 303a, 303b and 303c, an operating frequency storage unit 200, a reference operating frequency setting unit 400, and operational information acquisition timing control units 307a, 307b and 307c.

Each of the counting units 302a, 302b and 302c receives a clock signal with the same operating frequency as the clock signal, CLa, CLb or CLc, that is input to the corresponding processing unit, 301a, 301b or 301c. Each counting unit counts the clock signals input to the corresponding one of the processing units 301a, 301b and 301c.

Figure 2:
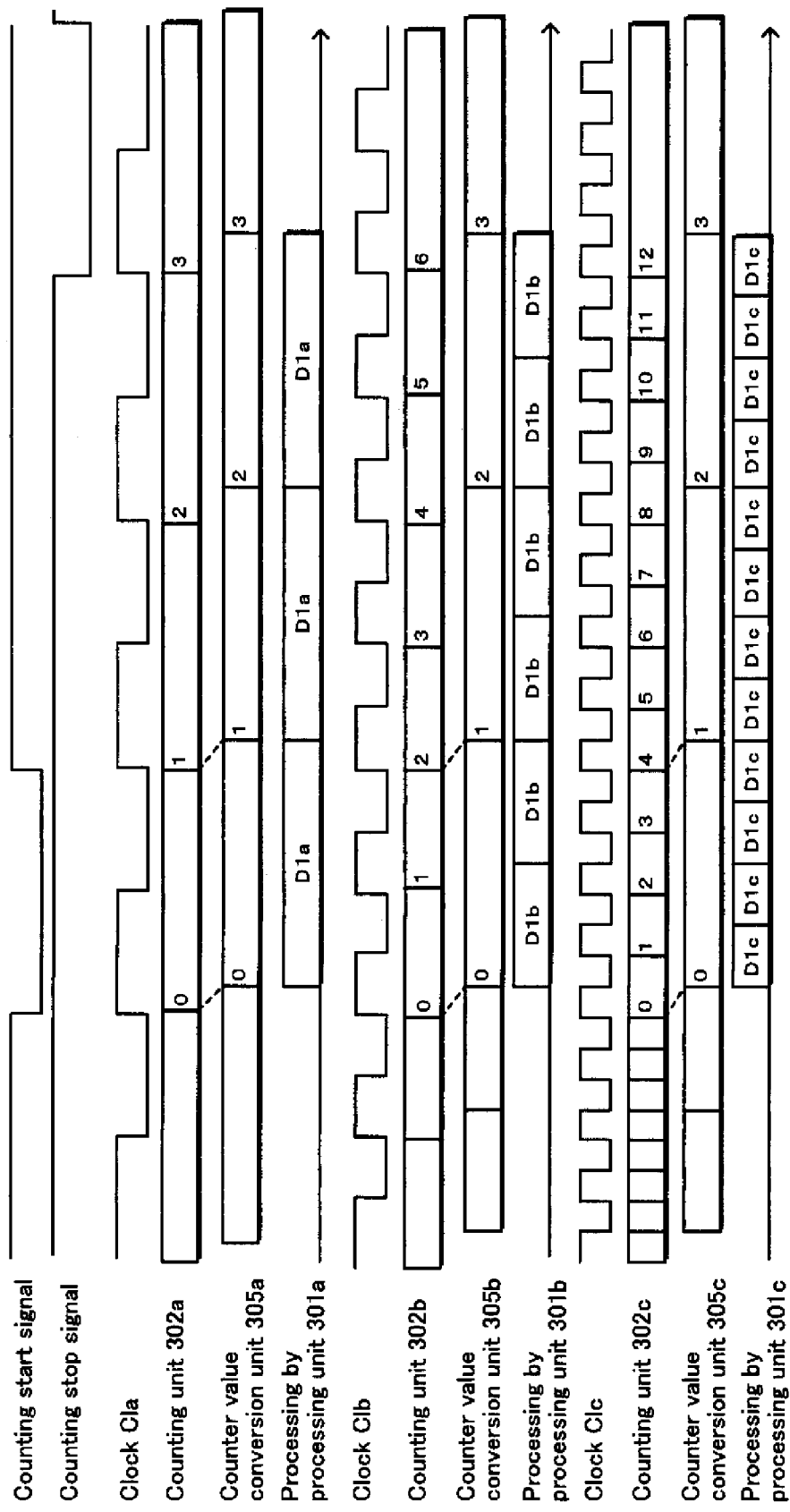
FIG. 2 illustrates counting control performed on a counting unit pertaining to Embodiment 1.

The counting units 302a, 302b and 302c are as shown in FIG. 2, controlled by the counting control unit 309 so that the counting units 302a, 302b and 302c count the clock signals. The counting control unit 309 outputs a counting start signal as an instruction to start the counting and a counting stop signal as an instruction to stop the counting, to the counting units 302a, 302b and 302c. In other words, the timing of the counting start and the counting stop by the counting units 302a, 302b and 302c is under centralized control by the counting control unit 309. Note that at the counting start, each of the counting units 302a, 302b and 302c may reset its counter value to 0, or retain the previous value.

The counting control unit 309 is realized with, for example, a processor provided inside the parallel processing apparatus 100. The counting control unit 309 provides the counting units 302a, 302b and 302c with instructions about the start timing for counting the clock signals CLa, CLb and CLc, respectively. The clock signals CLa, CLb and CLc are input to the counting units 302a, 302b and 302c with the operating frequencies of the processing units 301a, 301b and 301c, respectively.

Between the counting control unit 309 and each of the counting units 302a, 302b and 302c, delay circuits are provided at appropriate locations, to eliminate the differences among the timings of the counting start signals input to the counting units 302a, 302b and 302c. The delay circuits control the counting start signals from the counting control unit 309 such that the counting start signals reach the counting units 302a, 302b and 302c at the same time. Note that the counting control unit 309 may be realized as a microcomputer provided outside the parallel processing apparatus 100. Although the present embodiment described above is provided with the counting control unit 309, the processing units 301a, 301b and 301c may output the counting start signals to the counting units 302a, 302b and 302c, for example.

As described above, the counting control unit 309 brings the counting start timings of the counting units 302a, 302b and 302c to coincide with each other, thereby keeping the temporal relationship among the trace information pieces obtained for the processing units 301a, 301b and 301c in perspective.

Each of the counter value conversion units 305a, 305b and 305c outputs, for the corresponding processing unit, 301a, 301b or 301c, a converted counter value. Each converted counter value is obtained by converting the count of clock signals, which is measured with the operating frequency of the corresponding processing unit, 301a, 301b or 301c and is output from the corresponding counting unit, 302a, 302b or 302c, into the count of clock signals assuming that the clock signals are measured with a predetermined reference operating frequency.

Figure 4:
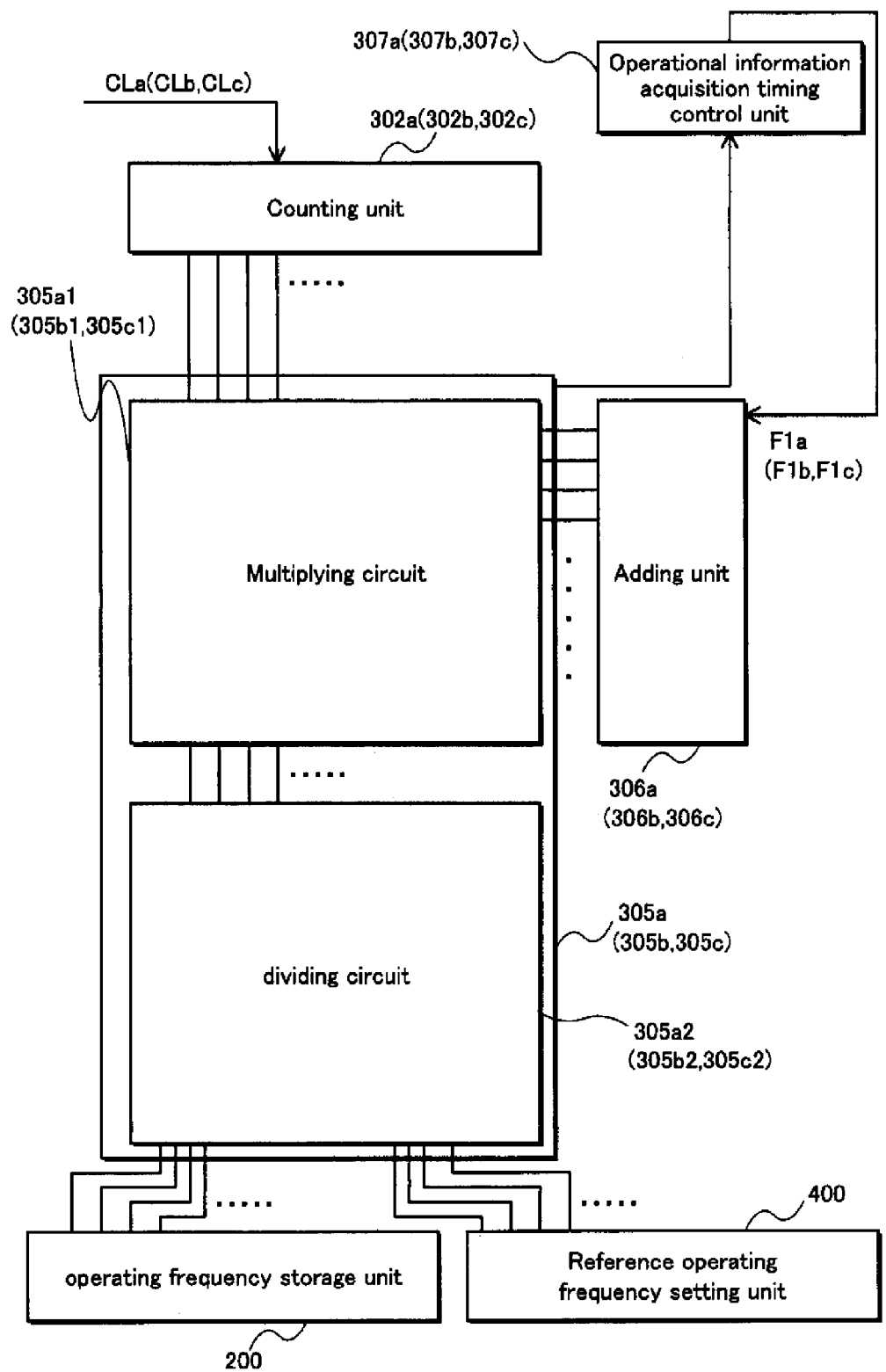
FIG. 4 is a block diagram showing the structure of a counter value conversion unit pertaining to Embodiment 1.

Also, as shown in FIG. 4, the counter value conversion units 305a, 305b and 305c include dividing circuits 305a2, 305b2 and 305c2 and multiplying circuits 305a1, 305b1 and 305c1, respectively. Each of the dividing circuits 305a2, 305b2 and 305c2 outputs a conversion coefficient obtained by dividing the reference operating frequency, acquired from the reference operating frequency setting unit 400, by the operating frequency of the corresponding processing unit, 301a, 301b or 301c, acquired from the operating frequency storage unit 200. Each of the multiplying circuits 305a1, 305b1 and 305c1 outputs a converted counter value obtained by multiplying the counter value output from the corresponding counting unit, 302a, 302b or 302c, by the conversion coefficient output from the corresponding dividing circuit, 305a2, 305b2 or 305c2. Thus, each of the counter value conversion units 305a, 305b and 305c acquires the operating frequency of the corresponding processing unit, 301a, 301b or 301c, from the operating frequency storage unit 200, acquires the reference operating frequency from the reference operating frequency setting unit 400, and outputs a converted counter value obtained by multiplying the counter value received from the corresponding counting unit, 302a, 302b or 302c, by the conversion coefficient obtained by dividing the operating frequency of the corresponding processing unit, 301a, 301b or 301c, by the reference operating frequency (i.e., (converted counter value)=(counter value)×(reference operating frequency)/(operating frequency)). As described above, each of the counter value conversion units 305a, 305b and 305c outputs a converted counter value obtained by performing arithmetic operations on the counter value output from the corresponding counting unit, 302a, 302b or 302c. Thus, the times at which the converted counter values are output by the counter value conversion units 305a, 305b and 305c lag behind the times at which the operational information pieces D1a, D1b and D1c corresponding to the counter values output by the counting units 302a, 302b and 302c are output. As shown in FIG. 2, when the lags behind the times at which the counter values are output by the counting units 302a, 302b and 302c are within a single clock cycle, the adding units 306a, 306b and 306c add the converted counter values to the operational information pieces D1a, D1b and D1c without any change, respectively. On the other hand, when the lags are not within a single clock cycle, the operational information pieces D1a, D1b and D1c are delayed according to the lags. FIG. 2 shows an example in which each of the counter value conversion units 305a, 305b and 305c outputs a converted counter value that has been obtained by omitting the decimal fraction of the multiplication result. Here, it is not necessary that the counter value conversion units 305a, 305b and 305c output a converted counter value that has been obtained by omitting the decimal fraction of the multiplication result. For example, they may output a converted counter value that has been obtained by rounding the multiplication result to the nearest integer. Alternatively, they may output a converted counter value that has been obtained by rounding the multiplication result only when the multiplication result contains a non-terminating decimal.

The following explains the calculation of a converted counter value performed by the counter value conversion units 305a, 305b and 305c, with a specific example.

Assume the case where the operating frequencies of the processing units 301a, 301b, and 301c are 100 MHz, 200 MHz and 400 MHz, respectively. If this is the case, when the counter value output from the counting unit 302a reaches 1000 cycles, the counter value output from the counting unit 302b is counter value2000 cycles, and the counter value output from the counting unit 302c is 4000 cycles.

Here, assume that reference operating frequency is equal to the operating frequency of the processing unit 301a, namely 100 MHz. If this is the case, the converted counter value output from the counter value conversion unit 305a is (100 [MHz]/100 [MHz])×1000 [cycles]=1000 [cycles]. At the time when the converted counter value is output from the counter value conversion unit 305a, the converted counter value output from the counter value conversion unit 305b is (100 [MHz]/200 [MHz])×2000 [cycles]=1000 [cycles], and the converted counter value output from the counter value conversion unit 305c is (100 [MHz]/400 [MHz])×4000 [cycles]=1000 [cycles]. In this way, the counter value conversion units 305a, 305b and 305c perform the conversion on the counter values output from the counting units 302a, 302b and 302c. Thus, even if the operating frequencies of the clock signals input to the processing units 301a, 301b and 301c are not the same, it is possible to make the counter values output from the counting units 302a, 302b and 302c consistent with each other.

The operational information acquisition timing control unit 307a, 307b and 307c are provided in the counter value conversion units 305a, 305b and 305c, respectively. The operational information acquisition timing control units 307a, 307b and 307c output operational information acquisition instructions F1a, F1b and F1c to the adding units 306a, 306b and 306c when the counter value conversion units 305a, 305b and 305c output the converted counter values, respectively.

As shown in FIG. 2, for each of the processing units 301a, 301b and 301c, the corresponding adding unit, 306a, 306b or 306c, acquires the corresponding operational information piece, D1a, D1b or D1c, when the converted counter value is output from the corresponding counter value conversion unit, 305a, 305b or 305c, and performs the addition of the converted counter value. Here, when each of the operational information acquisition timing control units 307a, 307b and 307c outputs the corresponding operational information acquisition instruction, F1a, F1b, or F1c, to the corresponding adding unit, 306a, 306b or 306c, the adding unit acquires the operational information piece containing a plurality of items, that is acquirable at the time of the receipt of the operational information acquisition instruction, from the corresponding processing unit, 301a, 301b or 301c.

FIG. 5 is a conceptual diagram of data that contains the operational information, D1a, D1b or D1c, to which the converted counter value has been added by the corresponding adding unit, 306a, 306b or 306c. Each operational information piece contains sets of items, such as the number of processing cycles, the number of executed instructions, the number of executed calculations, the cache memory hit rate and the cache memory miss rate, and the operation rates of the calculation resources. As shown in FIG. 5, a single converted counter value, #m or #m+1, is added to each set of items acquired when the corresponding operational information acquisition instruction, F1a, F1b or F1c, is issued. Although not illustrated in FIG. 5, each of the adding units 306a, 306b and 306c adds an identifier to the converted counter value when adding the converted counter value to the operational information piece, so that the converted counter value is distinguishable from among the items in the operational information piece, including the converted counter value.

Each of the storage units 303a, 303b and 303c stores an operational information piece to which a converted counter value has been added by the corresponding adding unit, 306a, 306b or 306c.

Each of the storage units 303a, 303b and 303c includes storage elements such as a memory and a register, and stores therein the operational information and the converted counter value as shown in FIG. 5. The operational information and the converted counter value stored in each of the storage units 303a, 303b and 303c are written by the corresponding adding unit, 306a, 306b or 306c. The operational information and the converted counter value stored in each of the storage units 303a, 303b and 303c is read by a read unit 1300 before the corresponding adding unit, 306a, 306b or 306c, overwrites them with new operational information and a new converted counter value. The read unit 1300 stores the operational information pieces and the converted counter values read from the storage units 303a, 303b and 303c into an external storage unit 1400 that is provided outside the parallel processing apparatus 100.

The operating frequency storage unit 200 stores therein the operating frequencies of the processing units 301a, 301b and 301c. As shown in FIG. 3, the operating frequency storage unit 200 stores an operating frequency management table that contains a field 3001 for identifying the processing units 301a, 301b and 301c (hereinafter referred to as "processing unit ID field") and a field 3002 for showing the operating frequencies of the processing units 301a, 301b and 301c (hereinafter referred to as "operating frequency field"). In the tracing apparatus pertaining to the present embodiment, the operating frequency field 3002 in the operating frequency management table is set or changed with a control apparatus (not illustrated) that is provided outside the parallel processing apparatus 100 and includes a microcomputer for the control.

The operating frequency storage unit 200 is realized with storage elements such as a memory and a register. When the operating frequencies of the processing unit 301a, 301b and 301c are fixed values, the operating frequency field 3002 in the operating frequency management table is provided with the fixed operating frequencies in advance. The tracing apparatus 101 pertaining to the present embodiment is capable of performing the tracing on each of the processing units 301a, 301b and 301c with reference to the same timeline only if the operating frequencies of the processing units 301a, 301b and 301c are stored in the operating frequency storage unit 200. Thus, even when the operating frequency of any of the processing units 301a, 301b and 301c is changed, it is possible to easily modify the conversion of the counter values by the counter value conversion units 305a, 305b and 305c by storing the new operating frequency into the operating frequency storage unit 200.

The reference operating frequency setting unit 400 sets the reference operating frequency to the counter value conversion units 305a, 305b and 305c. The reference operating frequency setting unit 400 sets the reference operating frequency, which is required by the counter value conversion units 305a, 305b and 305c to calculate the converted counter values, to each of the counter value conversion units 305a, 305b and 305c. The reference operating frequency is determined and set by a reference operating frequency control apparatus (not illustrated) that is provided outside the parallel processing apparatus 100 and includes a microcomputer. In the case where the reference operating frequency setting unit 400 sets the operating frequency of the processing unit 301a as the reference operating frequency, the converted counter values output from the counter value conversion units 305b and 305c are relative values of the numbers of operation cycles (i.e. counter values) of the processing units 301b and 301c to the number of operation cycles of the processing unit 301a. In the case where the reference operating frequency setting unit 400 sets the operating frequency of the processing unit 301b as the reference operating frequency, the converted counter values output from the counter value conversion units 305a and 305c are relative values of the numbers of operation cycles of the processing units 301a and 301c to the number of operation cycles of the processing unit 301b. In the case where the reference operating frequency setting unit 400 sets the operating frequency of the processing unit 301c as the reference operating frequency, the converted counter values output from the counter value conversion units 305a and 305b are relative values of the processing units 301a and 301b to the number of operation cycles of the processing unit 301c Note that a single processing apparatus may be structured from the processing unit 301a, the counting unit 302a, the counter value conversion unit 305a, the adding unit 306a, the storage unit 303a and the operational information acquisition timing control unit 307a. Also, a single processing apparatus may be structured from the processing unit 301b, the counting unit 302b, the counter value conversion unit 305b, the adding unit 306b, the storage unit 303b and the operational information acquisition timing control unit 307b, and a single processing apparatus may be structured from the processing unit 301c, the counting unit 302c, the counter value conversion unit 305c, the adding unit 306c, the storage unit 303c, and the operational information acquisition timing control unit 307c.

The storage units 303a, 303b and 303c are provided with read signal input ports 303a1, 303b1 and 303c1 and operational information output ports 303a2, 303b2 and 303c2, respectively. Each of the read signal input ports 303a1, 303b1 and 303c1 is a port to which a read signal that requests for reading of the operational information and the converted counter value is input from the read unit 1300. Each of the operational information output ports 303a2, 303b2 and 303c2 is a port from which the operational information and the converted counter value are output in response to the input of the read signal. The read unit 1300 and the storage units 303a, 303b and 303c are connected via a plurality of signal lines, which include signal lines for transmitting the read signals from the read unit 1300 and signal lines for transmitting data such as the operational information pieces and the converted counter values output from the storage units 303a, 303b and 303c. The read unit 1300 reads the operational information pieces and the converted counter values from the storage units 303a, 303b and 303c by issuing read requests to the storage units 303a, 303b and 303c. The read unit 1300 stores the operational information pieces and the converted counter values read from the storage units 303a, 303b and 303c into an external storage unit 1400 that is provided outside the parallel processing apparatus 100.

In the present embedment, it is assumed that the operating frequencies of the processing units 301a, 301b, and 301c are 100 MHz, 200 MHz and 400 MHz, respectively. However, the present invention is not limited to this.

Also, the reference operating frequency is not necessary the same as one of the operating frequencies of the processing units 301a, 301b and 301c. That is, the reference operating frequency may be set to be different from any of the operating frequencies of the processing units 301a, 301b and 301c. Also, if the reference operating frequency is set to 32.768 kHz, the converted counter value will be a relative value to the actual clock time.

<2> Operations

The following explains the operations of the tracing apparatus pertaining to the present embodiment, with reference to FIG. 2.

FIG. 2 shows the case where the reference operating frequency is set to be the same as the operating frequency of the processing unit 301a.

The processing units 301a, 301b and 301c perform data processing in synchronization with clocks CLa, CLb and CLc provided from the clock generation unit 1200, respectively. These clocks have frequencies that are different from each other. While performing the data processing, each of the processing units 301a, 301b and 301c outputs the corresponding operational information piece, D1a, D1b or D1c, to the corresponding adding unit, 306a, 306b or 306c.

Meanwhile, as shown in FIG. 2, each of the counting units 302a, 302b and 302c starts counting the corresponding clock, CLa, CLb or CLc, when receiving a counting start signal from the counting control unit 309, and outputs the counter value to the corresponding counter value conversion unit, 305a, 305b or 305c. Here, each of the counting units 302a, 302b and 302c starts the counting on detection of the falling edge of the counting start signal.

On receipt of the counter value from the corresponding counting unit, 302a, 302b or 302c, each of the counter value conversion units 305a, 305b and 305c calculates a conversion coefficient by dividing the operating frequency of the corresponding processing unit, 301a, 301b or 301c, acquired from the operating frequency storage unit 200, by the reference operating frequency set by the reference operating frequency setting unit 400. Then, each of the counter value conversion units 305a, 305b and 305c multiplies the counter value output from the corresponding counting unit, 302a, 302b or 302c, by the corresponding conversion coefficient, and outputs the multiplication result as a converted counter value to the corresponding adding unit, 306a, 306b or 306c. Note that each of the counter value conversion units 305a, 305b and 305c truncates the decimal fraction of the corresponding multiplication result.

Each of the adding units 306a, 306b and 306c adds the converted counter value received from the corresponding counter value conversion unit, 305a, 305b or 305c, to the operational information piece, D1a, D1b or D1c, received from the corresponding processing unit 301a, 301b or 301c. In this way, each of the adding units 306a, 306b and 306c writes the operational information piece and the converted counter value into the corresponding storage unit, 303a, 303b or 303c.

The operational information and the converted counter value stored in each of the storage units 303a, 303b and 303c is read by the read unit 1300 before the corresponding adding unit, 306a, 306b or 306c, overwrites them with new operational information and a new converted counter value.

The read unit 1300 stores the operational information pieces and the converted counter values read from the storage units 303a, 303b and 303c into the external storage unit 1400 that is provided outside the parallel processing apparatus 100.

Embodiment 2

<1> Structure

Figure 6:
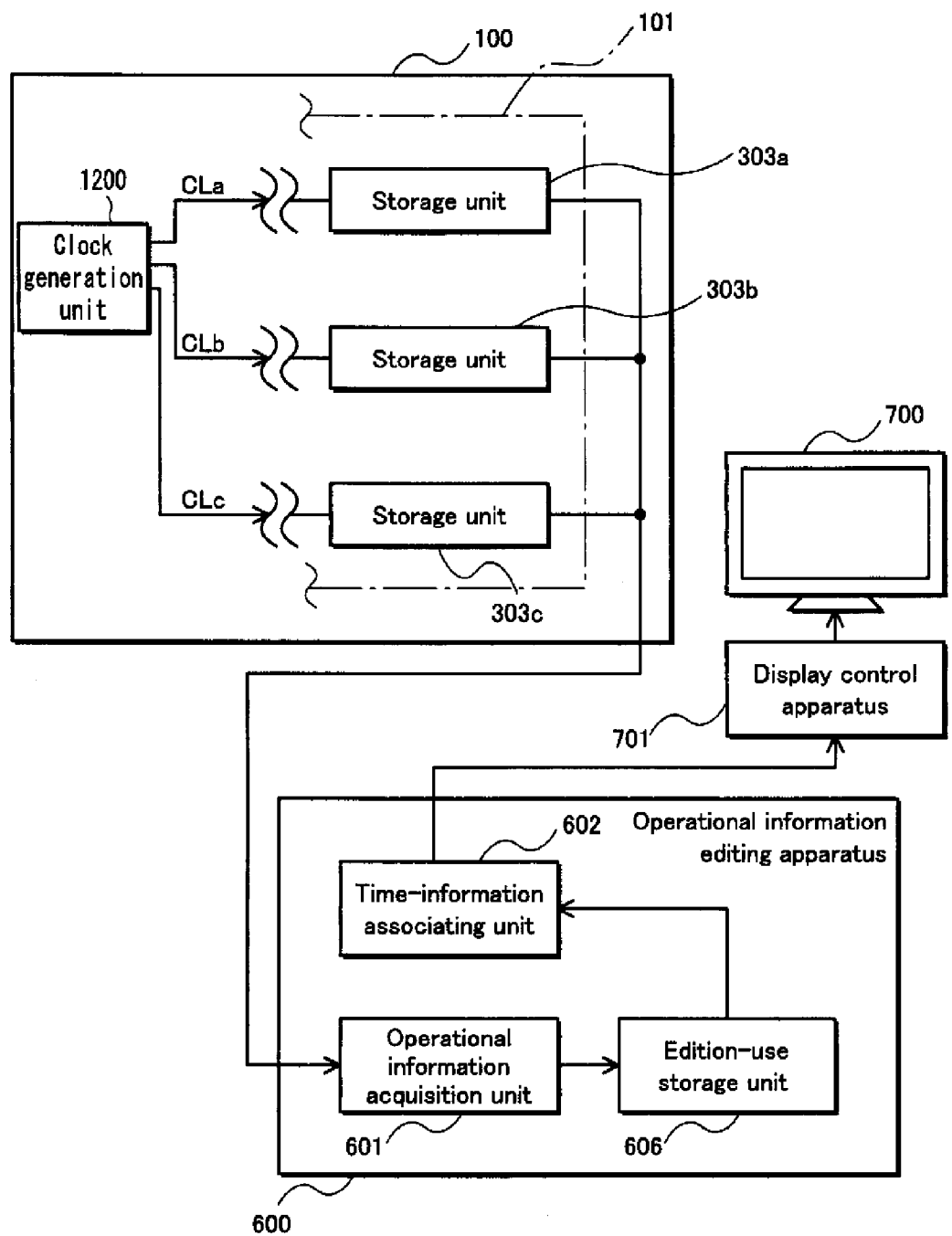
FIG. 6 is a block diagram showing the structure of a tracing system pertaining to Embodiment 2.

FIG. 6 is a block diagram showing the structure of a tracing system pertaining to this embodiment.

As shown in FIG. 6, the tracing system pertaining to this embodiment performs tracing on the parallel processing apparatus 100. The parallel processing apparatus 100 includes three processing units (not illustrated). The processing units perform data processing based on clock signals CLa, CLb and CLc respectively, which are provided from the clock generation unit 1200. Also, the processing units output operational information pieces D1a, D1b and D1c respectively, which relate to operations performed in the data processing. The processing units operate at different operating frequencies. Note that each of the processing units consists of a CPU core, a processor, or the like.

In FIG. 6, the components shown in FIG. 1 are omitted, except the storage units 303a, 303b and 303c. Also, the components of the tracing apparatus 101 will not be described in detail, because they are the same as Embodiment 1. In the following description, the components of the tracing apparatus 101 are explained with the use of the reference numbers shown in FIG. 1.

As shown in FIG. 6, the tracing system pertaining to this embodiment includes the tracing apparatus 101 of Embodiment 1, an operational information acquisition unit 601, an operational information editing apparatus 600, and a display apparatus. The operational information acquisition unit 601 acquires the operational information pieces D1a, D1b and D1c from the storage units 303a, 303b and 303c included in the tracing apparatus 101, respectively. The operational information editing apparatus 600 includes a time-information associating unit 602. The time-information associating unit 602 extracts the converted counter values from the operational information pieces D1a, D1b and D1c acquired by the operational information acquisition unit 601, and associates the extracted converted counter values one-to-one with the operational information pieces D1a, D1b and D1c. Here, each of the converted counter values is used as the time at which the corresponding adding unit, 306a, 306b or 306c, acquires the operational information piece, D1a, D1b or D1c. The display apparatus includes a display control apparatus 701 and a monitor 700, and displays the operational information pieces of the processing unit 301a, 301b and 301c in a time sequence.

Each of the storage units 303a, 303b and 303c notifies the operational information acquisition unit 601 on completion of the writing of a certain amount of the corresponding operational information, D1a, D1b or D1c, by the corresponding adding unit, 306a, 306b or 306c.

The operational information editing apparatus 600 is connected to the parallel processing apparatus 100, and includes a computer that is capable of executing a program for editing the operational information pieces. The operational information editing apparatus 600 realizes the functions of the operational information acquisition unit 601 and the time-information associating unit 602 by executing the program on the computer. The operational information editing apparatus 600 also includes an edition-use storage unit 606, which temporarily stores the operational information pieces and the converted counter values acquired by the operational information acquisition unit 601 for the editing of the operational information pieces.

On receipt of the notification showing the completion of the writing of the certain amount of the corresponding operational information from each of the storage units 303a, 303b and 303c, the operational information acquisition unit 601 reads the operational information piece and the corresponding converted counter value from each of the storage units 303a, 303b and 303c. Note that the functions of the operational information acquisition unit 601 are realized with a control apparatus such as a processor included in the operational information editing apparatus 600.

The edition-use storage unit 606 is realized as a certain area in a memory provided within the operational information editing apparatus 600. FIG. 7A is a conceptual diagram showing data sets stored in the edition-use storage unit 606, which include the operational information pieces and the converted counter values. The operational information pieces are classified in one to one correspondence with the processing units 301a, 301b and 301c, and each operational information piece contains sets of items, such as the number of processing cycles, the number of executed instructions, the number of executed calculations, the cache memory hit rate and the cache memory miss rate, and the operation rates of the calculation resources. As shown in FIG. 7A, a single converted counter value is added to each set of items acquired by the corresponding adding unit, 306a, 306b or 306c, when the corresponding operational information acquisition timing control unit, 307a, 307b or 307c, issues the corresponding operational information acquisition instruction, F1a, F1b or F1c. For example, as shown in FIG. 7A, regarding the operational information pieces acquired when the operational information acquisition timing control units 307a, 307b and 307c issue the operational information acquisition instructions F1a, F1b and F1c respectively, the converted counter values #L and #M are added to the sets of items contained in the operational information piece output from the processing unit 301a, and the converted counter values #M and #N are added to the sets of items contained in the operational information piece output from the processing unit 301b. In this way, the converted counter values added to the operational information pieces relating to the processing units 301a and 301b are the same in some cases, and are different in other cases. In other words, the operational information acquisition timing control units 307a, 307b and 307c are capable of outputting the operational information acquisition instructions F1a, F1b and F1c to the processing units 301a, 301b, 301c at the same time, as required. Also, the operational information acquisition timing control units 307a, 307b and 307c are capable of outputting the operational information acquisition instructions F1a, F1b and F1c to the processing units 301a, 301b, 301c at different times, as required.

Although not illustrated in FIG. 7A, identifiers are given to the converted counter values which are to be added to the operational information pieces output from the processing units 301a, 301b and 301c, so that the converted counter values are distinguishable from among the items in the operational information pieces including the converted counter values.

As shown in FIG. 7A, the time-information associating unit 602 extracts sets of items that have the same converted counter value, from the data containing the operational information pieces corresponding to the processing units 301a, 301b and 301c and the converted counter values. Then, as shown in FIG. 7B, the time-information associating unit 602 integrates the sets of the items having the same converted counter value, and associates the operational information pieces with each other by using the converted counter value as the time at which the corresponding adding unit, 306a, 306b or 306c, acquired the corresponding operational information piece, D1a, D1b or D1c. Specifically, the time-information associating unit 602 rearranges the integrated sets of items in the ascending order of the converted counter values, and stores them in the edition-use storage unit 606.

Here, as described above, each converted counter value is obtained by multiplying the counter value output from the corresponding counting unit, 302a, 302b or 302c, by the conversion coefficient obtained by dividing the reference operating frequency by the operating frequency of the corresponding processing unit, 301a, 301b or 301c. Thus, the converted counter values for the processing units 301a, 301b and 301c can be not exactly the same, depending on the operating frequencies of the processing units 301a, 301b and 301c. Thus, when extracting sets of items that have the same converted counter value from the operational information pieces stored in the edition-use storage unit 606, even if two converted counter values being compared with each other have a difference that is less than 1, the time-information associating unit 602 determines that the converted counter values are the same. Note that the time-information associating unit 602 may simply extract the sets of items and arrange them according to the timeline, without comparing the difference between the converted counter values with the conversion coefficient.

The display apparatus includes a monitor 700 and a display control apparatus 701 for controlling the monitor 700. When all the sets of items in the operational information pieces, rearranged in the ascending order of the converted counter values by the time-information associating unit 602, have been stored in the edition-use storage unit 606, the display control apparatus 701 reads and displays the items on the monitor 700 according to the timeline.

<2> Operations

In the present embodiment, the operations of the tracing apparatus 101 are the same as Embodiment 1. Thus, the explanation thereof is omitted.

The following explains the operations of the operational information editing apparatus 600 and the display control apparatus 701.

First, on receipt of the notification showing the completion of the writing of the certain amount of the corresponding operational information from each of the storage units 303a, 303b and 303c, the operational information acquisition unit 601 reads the operational information piece and the corresponding converted counter values from each of the storage units 303a, 303b and 303c.

The operational information acquisition unit 601 writes the operational information pieces and the converted counter values, read from the storage units 303a, 303b and 303c in the parallel processing apparatus 100, into the edition-use storage unit 606.

When the edition-use storage unit 606 stores the operational information pieces and the converted counter values, the time-information associating unit 602 reads the operational information pieces and the converted counter values from the edition-use storage unit 606. After that, the time-information associating unit 602 extracts sets of items that have the same converted counter value from the operational information pieces corresponding to the processing units 301a, 301b, 301c. Then, as shown in FIG. 7B, the time-information associating unit 602 integrates the sets of the items having the same converted counter value. After rearranging the integrated sets in the ascending order of the converted counter values, the time-information associating unit 602 writes the rearranged sets in the edition-use storage unit 606.

When all the sets of items in the operational information pieces, rearranged in the ascending order, have been stored in the edition-use storage unit 606, the display control apparatus 701 reads and displays the items on the monitor 700 according to the timeline.

Embodiment 3

Structure

FIG. 8 is a block diagram showing the structure of a tracing system pertaining to this embodiment.

The tracing system pertaining to this embodiment includes a tracing apparatus 102, an operational information editing apparatus 600, and a display apparatus (including a display control apparatus 701 and a monitor 700). The tracing apparatus 102 includes counting unit 302a, 302b and 302c, adding units 306a, 306b and 306c, operational information acquisition timing control units 307a, 307b and 307c, a counting control unit (not illustrated), and storage units 303a, 303b and 303c. The operational information editing apparatus 600 includes an operational information acquisition unit 601, a counter value extracting unit 607, a counter value conversion unit 605, an operating frequency storage unit 603, a reference operating frequency setting unit 604, and a time-information associating unit 602. The display apparatus displays items that are contained in the operational information pieces corresponding to the processing units 301a, 301b and 301c and associated with times by the time-information associating unit 602, according to the timeline.

Each of the counting units 302a, 302b and 302c outputs a counter value obtained by counting clock signals which are input with the operating frequency of the corresponding processing unit, 301a, 301b or 301c.

The counting control unit (not illustrated) provides the counting units 302a, 302b and 302c with instructions of the start timing for counting the clock signals CLa, CLb and CLc, respectively. The clock signals CLa, CLb and CLc are input to the counting units 302a, 302b and 302c with the operating frequencies of the processing units 301a, 301b and 301c, respectively.

Each adding unit, 306a, 306b or 306c, acquires the corresponding operational information piece, D1a, D1b or D1c from the corresponding processing unit, 301a, 301b or 301c, when a counter value is output from the corresponding counting unit, 302a, 302b or 302c. Then each adding unit adds a counter value output from the corresponding counting unit, 302a, 302b or 302c, to the corresponding operational information piece, D1a, D1b or D1c.

The operational information acquisition timing control unit 307a, 307b and 307c are provided in the counter value conversion units 302a, 302b and 302c, respectively. The operational information acquisition timing control units 307a, 307b and 307c output operational information acquisition instructions F1a, F1b and F1c to the adding units 306a, 306b and 306c when the counting units 302a, 302b and 302c output the counter values, respectively.

Each of the storage units 303a, 303b and 303c stores sets of items of the operational information piece and their corresponding counter values, respectively.

Each of the operational information acquisition unit 601 stores sets of items of the operational information piece and their corresponding counter values, for the corresponding storage unit, 303a, 303b or 303c. The counter value extracting unit 607 extracts, for each of the processing units 301a, 301b and 301c, the counter value of the clock signals measured with the operating frequency of the corresponding processing unit, from the sets of items contained in the corresponding operational information piece and their corresponding counter values acquired by the operational information acquisition unit 601. The counter value conversion unit 605 outputs converted counter values. Each converted counter value is obtained by converting the count of clock signals, which is measured with the operating frequency of the corresponding processing unit, 301a, 301b or 301c and extracted by the counter value extracting unit 607, into the count of clock signals assuming that the clock signals are measured with a predetermined reference operating frequency. The operating frequency storage unit 603 stores therein the operating frequencies of the processing units 301a, 301b and 301c. The reference operating frequency setting unit 604 sets the reference operating frequency to the counter value conversion unit 605. The time-information associating unit 602 associates the converted counter values output from the counter value conversion unit 605 with the corresponding operational information piece, D1a, D1b or D1c, by using each converted counter value as the time at which the corresponding adding unit, 306a, 306b or 306c, acquired the corresponding operational information piece, D1a, D1b or D1c.

The structure of the counting control unit is the same as Embodiment 1, and thus the description thereof is omitted.

Each of the adding units 306a, 306b and 306c adds the counter value output from the corresponding counting unit, 302a, 302b or 302c, to the operational information, D1a, D1b or D1c, output from the corresponding processing unit, 301a, 301b or 301c. Here, each of the adding units 306a, 306b and 306c acquires the operational information piece D1a, D1b or D1c from the corresponding processing unit, 301a, 301b or 301c, according to the operational information acquisition instruction, F1a, F1b or F1c, output from the corresponding operational information timing control unit 307a, 307b or 307c.

As shown in FIG. 8, when each of the adding units 306a, 306b and 306c receives the operational information acquisition instruction, F1a, F1b or F1c, from the corresponding operational information acquisition timing control unit, 307a, 307b or 307c, the adding units 306a, 306b and 306c acquire the sets of items at that point from the corresponding processing unit, 301a, 301b or 301c.

FIG. 9 is a conceptual diagram of data that contains the operational information piece, D1a, D1b or D1c, to which the counter value has been added by the corresponding adding unit, 306a, 306b or 306c. Each operational information piece contains sets of items, such as the number of processing cycles, the number of executed instructions, the number of executed calculations, the cache memory hit rate and the cache memory miss rate, and the operation rates of the calculation resources. As shown in FIG. 9, a single converted counter value, #m or #m+1, is added to each set of items acquired when the corresponding operational information acquisition instruction, F1a, F1b or F1c, is issued. Although not illustrated in FIG. 9, each of the adding units 306a, 306b and 306c adds an identifier to the counter value when adding the counter value to the operational information piece, so that the counter value is distinguishable from among the items in the operational information piece, including the counter value.

Each of the storage units 303a, 303b and 303c includes storage elements such as a memory and a register, and stores therein the operational information piece and the counter value.

The operational information and the counter value stored in each of the storage units 303a, 303b and 303c are written by the corresponding adding unit, 306a, 306b or 306c. Each of the storage units 303a, 303b and 303c notifies the operational information acquisition unit 601 on completion of the writing of a certain amount of the corresponding operational information piece, D1a, D 1b or D1c, and the corresponding counter values, performed by the corresponding adding unit, 306a, 306b or 306c. Here, note that each of the storage units 303a, 303b and 303c issues the notification of the completion of the writing of the operational information piece before the corresponding adding unit, 306a, 306b or 306c, overwrites the operational information and the corresponding counter values with new operational information and the corresponding counter values.

The storage units 303a, 303b and 303c are provided with signal input/output ports 303a1, 303b1 and 303c1 and operational information output ports 303a2, 303b2 and 303c2, respectively. Each of the signal input/output ports 303a1, 303b1 and 303c1 is a port from which a storage completion notification signal is output to the operational information acquisition unit 601 and to which an acquisition request signal is input from the operational information acquisition unit 601. A storage completion notification signal notifies of the completion of writing of a certain amount of operational information. An acquisition request signal requests for acquisition of the operational information and the corresponding counter value. Each of the operational information output ports 303a2, 303b2 and 303c2 is a port from which the operational information and the corresponding counter values are output in response to the input of the acquisition request signal. The operational information acquisition unit 601 and the storage units 303a, 303b and 303c are connected via a plurality of signal lines, which include signal lines for transmitting the acquisition request signals from the operational information acquisition unit 601 and signal lines for transmitting data such as the operational information pieces and the converted counter values output from the storage units 303a, 303b and 303c.

The operational information editing apparatus 600 is connected to the parallel processing apparatus 100, and includes a computer that is capable of executing a program for editing the operational information pieces. The operational information editing apparatus 600 realizes the functions of the operational information acquisition unit 601, the counter value extracting unit 607, the counter value conversion unit 605, the reference operating frequency setting unit 604, and the time-information associating unit 602 by executing the program on the computer. The operational information editing apparatus 600 also includes an edition-use storage unit 606, which temporarily stores the operational information pieces and the corresponding counter values and converted counter values acquired by the operational information acquisition unit 601 for the editing of the operational information pieces The counter value extracting unit 607 extracts counter values from the operational information pieces and the corresponding counter values stored in the edition-use storage unit 606, and outputs the extracted values to the counter value conversion unit 605.

The counter value conversion unit 605 calculates converted counter values by multiplying the counter values extracted by the counter value extracting unit 607 by conversion coefficients obtained by dividing the operating frequency of each processing unit, 301a, 301b or 301c, by the reference operating frequency. The counter value conversion unit 605 acquires information about the operating frequency of each of the processing units 301a, 301b and 301c from the operating frequency storage unit 603. The reference operating frequency is determined and set by the reference operating frequency setting unit 604. After calculating the converted counter values, the counter value conversion unit 605 replaces the counter values stored in the edition-use storage unit 606 with the converted counter values. The calculation of the converted counter values performed by the counter value conversion unit 605 is the same as Embodiment 1. Thus, explanation thereof is omitted.

The operating frequency storage unit 603 stores an operating frequency management table showing IDs and operating frequencies of the processing units 301a, 301b and 301c. The contents of the operating frequency management table are the same as Embodiment 1. Thus, explanation thereof is omitted. In the tracing system pertaining to the present embodiment, setting and changing of the contents in the operating frequency fields of the operating frequency management table are performed via a user interface 1000 provided outside the operational information editing apparatus 600. The operating frequency storage unit 603 is realized with a memory (not illustrated) provided within the operational information editing apparatus 600.

The reference operating frequency setting unit 604 sets the reference operating frequency to the counter value conversion unit 605. The reference operating frequency is required by the counter value conversion unit 605 to calculate the converted counter values. The reference operating frequency is set via the user interface 1000 provided outside the operational information editing apparatus 600.

The reference operating frequency setting unit 604 sets, as the reference operating frequency, the operating frequency of one of the processing units 301a, 301b and 301c. In the case where the reference operating frequency setting unit 604 sets the operating frequency of the processing unit 301a as the reference operating frequency, the converted counter values output from the counter value conversion unit 605 are relative values of the numbers of operation cycles of the processing units 302b and 302c to the number of operation cycles of the processing unit 301a. In the case where the reference operating frequency setting unit 400 sets the operating frequency of the processing unit 301b as the reference operating frequency, the converted counter values output from the counter value conversion units 305a and 305c are relative values of the processing units 301a and 301c to the number of operation cycles of the processing unit 301b. In the case where the reference operating frequency setting unit 604 sets the operating frequency of the processing unit 301c as the reference operating frequency, the converted counter values output from the counter value conversion unit 605 are relative values of the numbers of operation cycles of the processing units 301a and 301b to the number of operation cycles of the processing unit 301c.

Also, the reference operating frequency is not necessary the same as one of the operating frequencies of the processing units 301a, 301b and 301c. That is, the reference operating frequency may be set to be different from any of the operating frequencies of the processing units 301a, 301b and 301c. Also, if the reference operating frequency is set to 32.768 kHz, the converted counter value will be a relative value to the actual clock time.

The time-information associating unit 602 extracts sets of items that have the same converted counter value from the operational information pieces corresponding to the processing units 301a, 301b and 301c and their corresponding counter values and converted counter values stored in the edition-use storage unit 606. Then, the time-information associating unit 602 integrates the sets of the items having the same converted counter value. After that, the time-information associating unit 602 associates the operational information pieces with each other, by using the converted counter values as the times at which the corresponding adding unit, 306a, 306b or 306c, acquired the corresponding operational information piece, D1a, D1b or D1c. Specifically, the time-information associating unit 602 rearranges the integrated sets of items in the ascending order of the converted counter values, and stores them in the edition-use storage unit 606.

The display apparatus includes a monitor 700 and a display control apparatus 701 for controlling the monitor 700. When all the sets of items in the operational information pieces, rearranged in the ascending order of the converted counter values by the time-information associating unit 602, have been stored in the edition-use storage unit 606, the display control apparatus 701 reads and displays the items on the monitor 700 according to the timeline.

In the tracing system pertaining to the present embodiment, the counter value conversion unit 605 is provided outside the parallel processing apparatus 100. Thus, when the tracing apparatus 102 includes the counting units 302a, 302b and 302c, the adding units 306a, 306b and 306c, and the storage units 303a, 303b and 303c, it is possible to perform the tracing on the processing units 301a, 301b and 301c with reference to the same timeline simply by connecting the operational information editing apparatus 600 to the tracing apparatus 102. This makes it easy to conduct time-series analysis on the performance and the operations of the processing units 301a, 301b and 301c in the tracing apparatus 102 with reference to the same timeline.

<2> Operations

The following explains the operations of the tracing system pertaining to this embodiment.

The processing units 301a, 301b and 301c perform data processing in synchronization with clocks CLa, CLb and CLc provided from the clock generation unit 1200, respectively. These clocks have frequencies that are different from each other. While performing the data processing, each of the processing units 301a, 301b and 301c outputs the corresponding operational information piece, D1a, D1b or D1c, to the corresponding adding unit, 306a, 306b or 306c.

Meanwhile, each of the counting units 302a, 302b and 302c starts counting the clock CLa, CLb or CLc provided to the corresponding processing unit 301a, 301b or 301c when the processing unit receives the counting start signal from the counting control unit (not illustrated). Then, each counting unit, 302a, 302b or 302c, outputs its counter value to the corresponding adding unit, 306a, 306b or 306c.

Each of the adding units 306a, 306b and 306c adds the counter value received from the corresponding counting unit, 302a, 302b or 302c, to the operational information piece received from the corresponding processing unit 301a, 301b or 301c. In this way, each of the adding units 306a, 306b and 306c writes the operational information piece and the corresponding counter values into the corresponding storage unit, 303a, 303b or 303c.

Each of the storage units 303a, 303b and 303c notifies the operational information acquisition unit 601 on completion of the writing of a certain amount of the corresponding operational information piece and the corresponding counter values, performed by the corresponding adding unit, 306a, 306b or 306c.

On receipt of the notification showing the completion of the writing of the certain amount of the corresponding operational information and the corresponding counter values from each of the storage units 303a, 303b and 303c, the operational information acquisition unit 601 reads the operational information piece and the corresponding counter values from each of the storage units 303a, 303b and 303c.

The operational information acquisition unit 601 writes the operational information pieces and the corresponding counter values, read from the storage units 303a, 303b and 303c in the tracing apparatus 102, into the edition-use storage unit 606.

Next, the counter value extracting unit 607 extracts counter values from the operational information pieces and the corresponding counter values stored in the edition-use storage unit 606, and outputs the extracted counter values to the counter value conversion unit 605.

The counter value conversion unit 605 calculates the conversion coefficients on receipt of the counter values from the counter value extracting unit 607, by dividing the operating frequency of each processing unit, 301a, 301b or 301c, acquired from the operating frequency storage unit 603, by the reference operating frequency set by the reference operating frequency setting unit 604. Also, the counter value conversion unit 605 calculates the converted counter values by multiplying the counter values output from the counter value extracting unit 607 by the conversion coefficients. After that, the counter value conversion unit 605 replaces the counter values stored in the edition-use storage unit 606 with the converted counter values.

On completion of the replacement by the counter value conversion unit 605 of the counter values stored in the edition-use storage unit 606 with the converted counter values, the time-information associating unit 602 reads the operational information pieces and the converted counter values from the edition-use storage unit 606.

After that, the time-information associating unit 602 extracts sets of items that have the same converted counter value from the operational information pieces corresponding to the processing units 301a, 301b, 301c. Then, the time-information associating unit 602 integrates the sets of the items having the same converted counter value. After rearranging the integrated sets in the ascending order of the converted counter values, the time-information associating unit 602 writes the rearranged sets and the converted counter values in the edition-use storage unit 606.

When all the sets of items in the operational information pieces, rearranged in the ascending order, have been stored in the edition-use storage unit 606, the display control apparatus 701 reads and displays the items on the monitor 700 according to the timeline.

Embodiment 4

<1> Structure

Figure 10:
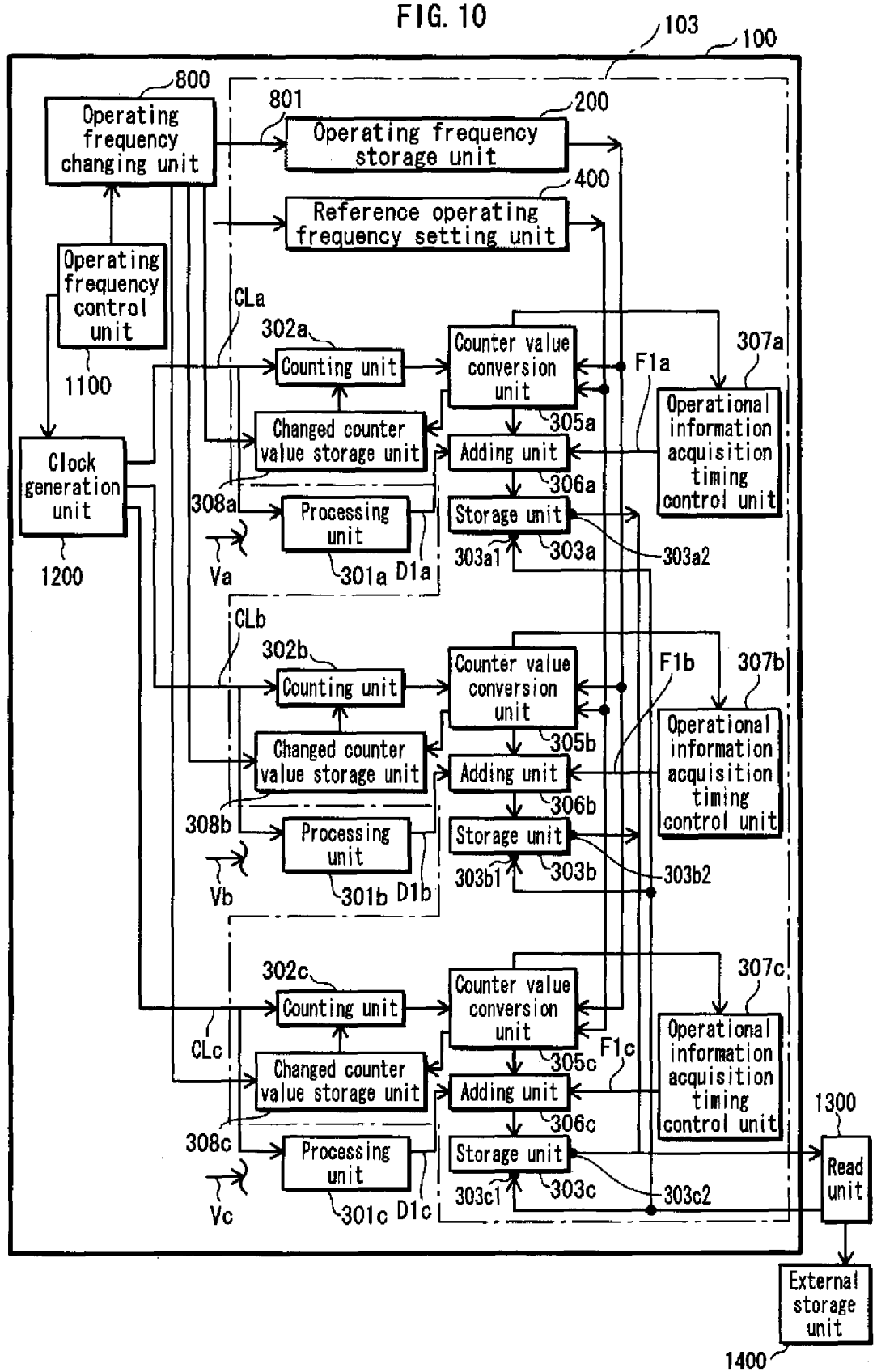
FIG. 10 is a block diagram showing the structure of a tracing apparatus pertaining to Embodiment 4.

FIG. 10 is a block diagram showing the structure of a tracing apparatus 103 pertaining to this embodiment.

In the parallel processing apparatus 100 pertaining to the present embodiment, DVFS (Dynamic Voltage and Frequency Scaling) technology is adopted. This technique is for dynamically changing the operating frequencies and the operating voltages of the processing units 301a, 301b and 301c to appropriate those values on the processing performed thereby, to reduce the power consumption of the entirety of the parallel processing apparatus 100. The operating frequencies and the operating voltages of the processing units 301a, 301b and 301c are individually changed according to the processing states of the processing unit 301a, 301b and 301c.

As shown in FIG. 10, the tracing apparatus 103 pertaining to the present embodiment performs the tracing on the parallel processing apparatus 100 that is provided with an operating frequency control unit 1100. The operating frequency control unit 1100 controls the operating frequencies of the processing units 301a, 301b and 301c, by dynamically changing the operating frequencies of the clock signals CLa, CLb and CLc input to the processing units 301a, 301b and 301c to appropriate values appropriate to the processing performed thereby, based on the operational information pieces output from the processing units 301a, 301b and 301c. Note that a single processing apparatus may be structured from the processing unit 301a, the counting unit 302a, the counter value conversion unit 305a, the adding unit 306a, the storage unit 303a, the operational information acquisition timing control unit 307a and a changed counter value storage unit 308a. Also, a single processing apparatus may be structured from the processing unit 301b, the counting unit 302b, the counter value conversion unit 305b, the adding unit 306b, the storage unit 303b, the operational information acquisition timing control unit 307b, and a changed counter value storage unit 308b and a single processing apparatus may be structured from the processing unit 301c, the counting unit 302c, the counter value conversion unit 305c, the adding unit 306c, the storage unit 303c, the operational information acquisition timing control unit 307c and a changed counter value storage unit 308c.

The operating frequency control unit 1100 calculates optimum operating frequencies for the processing units 301a, 301b and 301c and optimum operating voltages Va, Vb and Vc for keeping the performance of the processing apparatus including the processing units 301a, 301b and 301c, based on the operational information pieces output from the processing units 301a, 301b and 301c. The operating frequency control unit 1100 changes the operating frequencies of the clock signals CLa, CLb and CLc, input to the processing units 301a, 301b and 301c, to the obtained optimum values, and changes the operating voltages of the processing unit 301a, 301b and 301c to the obtained optimum values. For example, the operating frequency control unit 1100 acquires the items of the operational information pieces that indicate operation rates of the calculation resources. If this is the case, when the operation rates are high, the operating frequency control unit 1100 increases the operating frequencies of the processing units 301a, 301b and 301c and increases the operating voltages Va, Vb and Vc of the processing units. When the operation rates are low, the operating frequency control unit 1100 decreases the operating frequencies of the processing units 301a, 301b and 301c and decreases the operating voltages Va, Vb and Vc of the processing units to reduce the power consumption of the entirety of the parallel processing apparatus 100. Also, the operating frequency control unit 1100 controls the clock generation unit 1200, which provides the processing units 301a, 301b and 301c with the clock signals CLa, CLb and CLc, to change the operating frequencies, and controls a power source circuit (not illustrated) that is connected to the processing apparatus and includes a switching power source (not illustrated) and a regulator (not illustrated), to change the operating voltages.

The tracing apparatus 103 pertaining to this embodiment includes counting units 302a, 302b and 302c, counter value conversion units 305a, 305b and 305c, adding units 306a, 306b and 306c, a counting control unit (not illustrated), storage units 303a, 303b and 303c, an operating frequency storage unit 200, a reference operating frequency setting unit 400, an operating frequency changing unit 800, operational information acquisition timing control units 307a, 307b and 307c, and changed counter value storage units 308a, 308b and 308c.

Each of the counting units 302a, 302b and 302c is structured from a known timer/counter, and outputs a counter value obtained by counting clock signals which are input with the operating frequency of the corresponding processing unit, 301a, 301b or 301c.

The counting units 302a, 302b and 302c are controlled by the counting control unit so that the counting units 302a, 302b and 302c count the clock signals. The counting control unit outputs a counting start signal as an instruction to start the counting and a counting stop signal as an instruction to stop the counting, to the counting units 302a, 302b and 302c. In other words, the timing of the counting start and the counting stop by the counting units 302a, 302b and 302c is under centralized control by the counting control unit 309. Note that at the counting start, each of the counting units 302a, 302b and 302c may reset its counter value to 0, or retain the previous value.

Each of the counter value conversion units 305a, 305b and 305c outputs a converted counter value to the corresponding processing unit, 301a, 301b or 301c. Each converted counter value is obtained by converting the count of clock signals, which is measured with the operating frequency of the corresponding processing unit, 301a, 301b or 301c and is output from the corresponding counting unit, 302a, 302b or 302c, into the count of clock signals assuming that the clock signals are measured with a predetermined reference operating frequency.

Also, in the same manner as in Embodiment 1, the counter value conversion units 305a, 305b and 305c include dividing circuits 305a2, 305b2 and 305c2 and multiplying circuits 305a1, 305b1 and 305c1, respectively. Each of the dividing circuits 305a2, 305b2 and 305c2 outputs a conversion coefficient obtained by dividing the reference operating frequency, acquired from the reference operating frequency setting unit 400, by the operating frequency of the corresponding processing unit, 301a, 301b or 301c, acquired from the operating frequency storage unit 200. Each of the multiplying circuits 305a1, 305b1 and 305c1 outputs a converted counter value obtained by multiplying the counter value output from the corresponding counting unit, 302a, 302b or 302c, by the conversion coefficient output from the corresponding dividing circuit, 305a2, 305b2 or 305c2 (See FIG. 4). The calculation of the converted counter values performed by the counter value conversion units 305a, 305b and 305c is the same as Embodiment 1. Thus, explanation thereof is omitted.

Each of the counter value conversion units 305a, 305b and 305c acquires information about the operating frequency of each of the processing units 301a, 301b and 301c from the operating frequency storage unit 200. The reference operating frequency is determined and set by the reference operating frequency setting unit 400.

The counting control unit provides the counting units 302a, 302b and 302c with instructions about the start timing for counting the clock signals. The clock signals are input to the counting units 302a, 302b and 302c with the operating frequencies of the processing units 301a, 301b and 301c.

Each of the storage units 303a, 303b and 303c stores an operational information piece to which a converted counter value has been added by the corresponding adding unit, 306a, 306b or 306c. The operating frequency storage unit 200 stores therein the operating frequencies of the processing units 301a, 301b and 301c.

The operational information acquisition timing control unit 307a, 307b and 307c are provided in the counter value conversion units 305a, 305b and 305c, respectively. The operational information acquisition timing control units 307a, 307b and 307c output operational information acquisition instructions F1a, F1b and F1c to the adding units 306a, 306b and 306c when the counter value conversion units 305a, 305b and 305c output the converted counter values, respectively.

As shown in FIG. 11, the operating frequency storage unit 200 stores an operating frequency management table that contains a field 3001 for identifying the processing units 301a, 301b and 301c (hereinafter referred to as "processing unit ID field") and a field 3002 for showing the operating frequencies of the processing units 301a, 301b and 301c (hereinafter referred to as "operating frequency field"). Setting and changing of the contents in the operating frequency fields of the operating frequency management table stored in the operating frequency storage unit 200 are performed by the operating frequency changing unit 800.

Figure 11A:
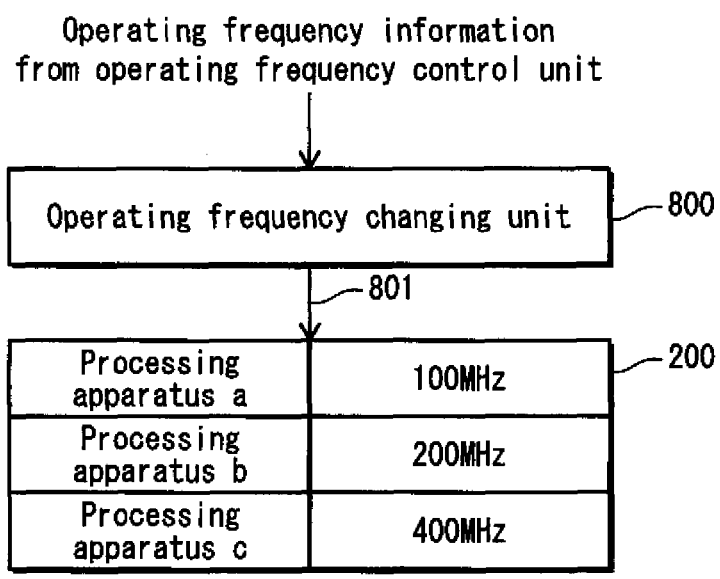
FIG. 11A and FIG. 11B illustrate changing of an operating frequency management table performed by an operating frequency change control unit pertaining to Embodiment 4.

When the operating frequencies of the processing units 301a, 301b and 301c at the operation start of the parallel processing apparatus 100 are 100 MHz, 200 MHz and 400 MHz, respectively, the operating frequency management table has been set as shown in FIG. 11A. The operating frequency control unit 1100 calculates the operating frequency of each processing unit 301a, 301b and 301c required to perform given data processing, based on the operational information pieces output from the processing unit. For example, when the operating frequency control unit 1100, based on the operational information pieces output from the processing units 301a, 301b and 301c, obtains frequencies 100 MHz, 400 MHz and 200 MHz as the required operating frequencies of the processing units 301a, 301b and 301c to perform the data processing, the operating frequency control unit 1100 generates operating frequency information and outputs it to the operating frequency changing unit 800. The operating frequency information includes processing unit IDs for identifying the processing units 301a, 301b and 301c and the required operating frequencies of the processing units 301a, 301b and 301c

Figure 11B:
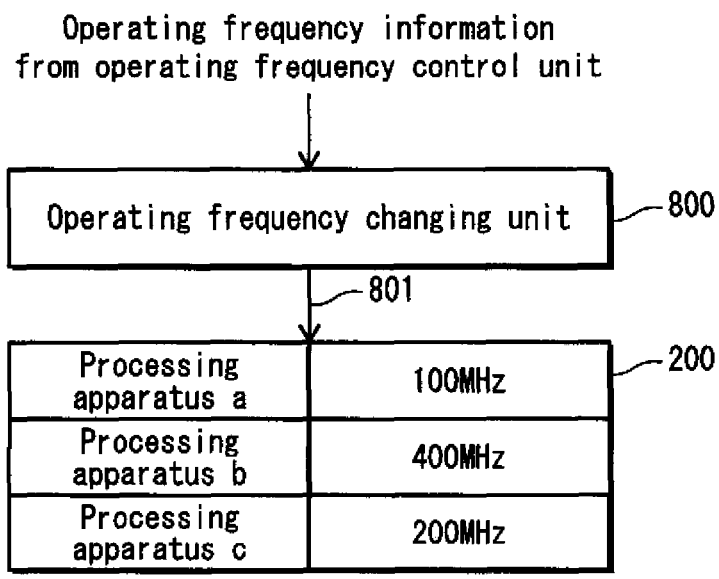

The operating frequency changing unit 800 receives the operating frequency information of the processing units 301a, 301b and 301c from the operating frequency control unit 1100. Then, the operating frequency changing unit 800 changes the contents of the operating frequency management table stored in the operating frequency storage unit 200, based on the received operating frequency information, as shown in FIG. 11B. Also, the operating frequency changing unit 800 outputs operating frequency change information 801 to each of the processing units 301a, 301b and 301c. The operating frequency change information notifies that the operating frequency of the clock signal to be input to the corresponding processing unit, 301a, 301b or 301c, has been changed.

Meanwhile, in the case of changing the frequency of the frequency synthesizer and the output voltage from the power source circuit including the switching power source and the regulator to change the operating frequencies and the operating voltages of the processing units 301a, 301b and 301c, the frequency of the frequency synthesizer and the output voltage from the power source circuit become unstable for a certain period (hereinafter called "unstable period"). Thus, the processing units 301a, 301b and 301c can not perform proper data processing in the unstable period. In the unstable period, the operating frequencies of the clock signals CLa, CLb and CLc are unstable as well. Thus, large errors will be contained in the counter values output from the counting units 302a, 302b and 302c. In view of the above, the operating frequency control unit 1100 pauses the data processing by the processing units 301a, 301b and 301c during the unstable period. Then, when the frequency of the frequency synthesizer and the output from the power source circuit become stable after the unstable period, the operating frequency control unit 1100 starts outputting the operating frequency information to the operating frequency changing unit 800, and restarts the data processing by the processing units 301a, 301b and 301c.

The changed counter value storage units 308a, 308b and 308c each include a register. In the case where the operating frequency control unit 1100 changes the frequencies of the clock signals to be input to the processing units 301a, 301b and 301c, each register temporary stores the converted counter values output from the corresponding counter value conversion unit, 305a, 305b or 305c, before the operating frequency control unit 1100 changes the frequencies of the clock signals to be input to the corresponding processing unit, 301a, 301b or 301c. On receipt of the operating frequency change information 801 from the operating frequency changing unit 800, each register stores the converted counter values obtained through the conversion of the counter value output from the corresponding counting unit, 302a, 302b or 302c, by the corresponding counter value conversion unit, 305a, 305b or 305c, before the operating frequency control unit 1100 changes the operating frequencies of the clock signals to be input to the corresponding processing unit, 301a, 301b or 301c. Here, each of the changed counter value storage units 308a, 308b and 308c accumulates and stores the converted counter values output from the corresponding counter value conversion unit, 305a, 305b or 305c, with the converted counter value stored in the corresponding changed counter value storage unit 308a, 308b or 308c every time the changed counter value storage unit receives the operating frequency change information 801 from the operating frequency changing unit 800.

The reference operating frequency setting unit 400 sets the reference operating frequency, which is required by the counter value conversion units 305a, 305b and 305c to calculate the converted counter values, to each of the counter value conversion units 305a, 305b and 305c. The reference operating frequency is determined and set by a reference operating frequency control apparatus (not illustrated) that is provided outside the parallel processing apparatus 100 and includes a microcomputer. In the case where the reference operating frequency setting unit 400 sets the operating frequency of the processing unit 301a as the reference operating frequency, the converted counter values output from the counter value conversion units 305b and 305c are relative values of the numbers of operation cycles of the processing units 302b and 302c to the number of operation cycles of the processing unit 301a. In the case where the reference operating frequency setting unit 400 sets the operating frequency of the processing unit 301b as the reference operating frequency, the converted counter values output from the counter value conversion units 305a and 305c are relative values of the numbers of operation cycles of the processing units 301a and 301c to the number of operation cycles of the processing unit 301b. In the case where the reference operating frequency setting unit 400 sets the operating frequency of the processing unit 301c as the reference operating frequency, the converted counter values output from the counter value conversion units 305a and 305b are relative values of the processing units 301a and 301b to the number of operation cycles of the processing unit 301c Also, the reference operating frequency is not necessary the same as one of the operating frequencies of the processing units 301a, 301b and 301c. That is, the reference operating frequency may be set to be different from any of the operating frequencies of the processing units 301a, 301b and 301c. Also, if the reference operating frequency is set to 32.768 kHz, the converted counter value will be a relative value to the actual clock time.

For each of the processing units 301a, 301b and 301c, the corresponding adding unit, 306a, 306b or 306c, acquires the operational information piece, D1a, D1b or D1c, corresponding to the converted counter values output from the corresponding counter value conversion unit, 305a, 305b or 305c, and adds the converted counter values to the operational information piece, D1a, D1b or D1c. Here, each of the adding units 306a, 306b and 306c acquires the operational information piece D1a, D1b or D1c from the corresponding processing unit, 301a, 301b or 301c, according to the operational information acquisition instruction, F1a, F1b or F1c, output from the corresponding operational information timing control unit 307a, 307b or 307c.

Figure 12:
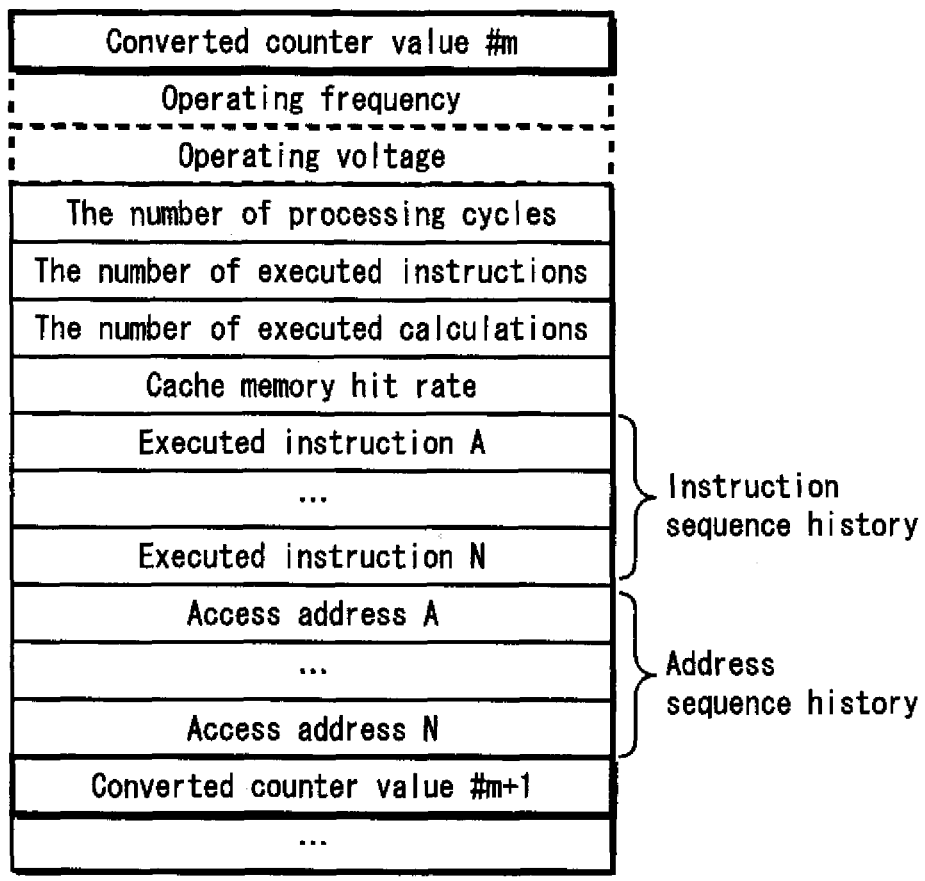
FIG. 12 is a conceptual diagram of data that contains operational information piece to which a converted counter value, an operating frequency and an operating voltage have been added by an adding unit pertaining to Embodiment 4.
Figure 16:
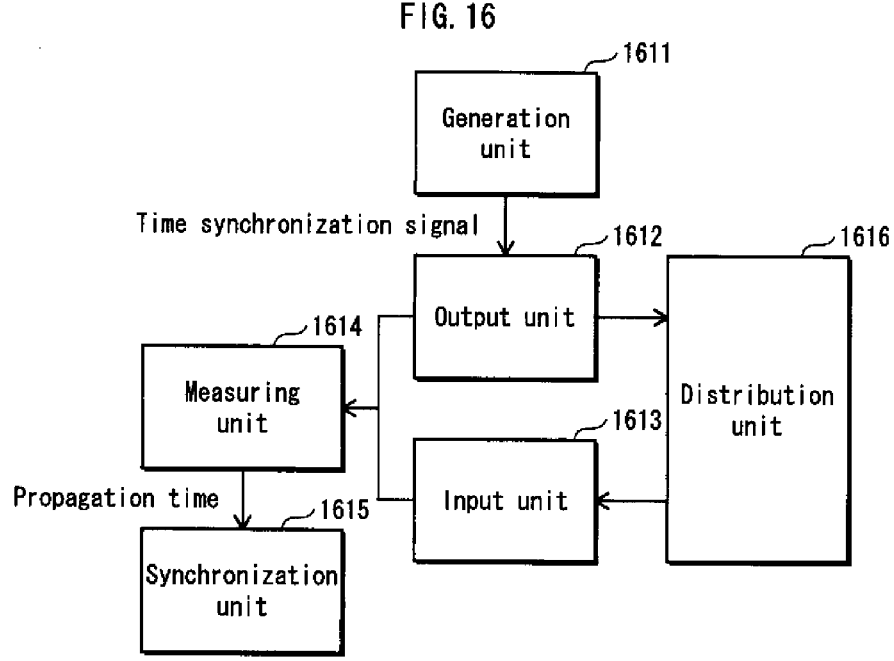
FIG. 16 shows the structure of a conventional timer adjustment system.
Figure 17:
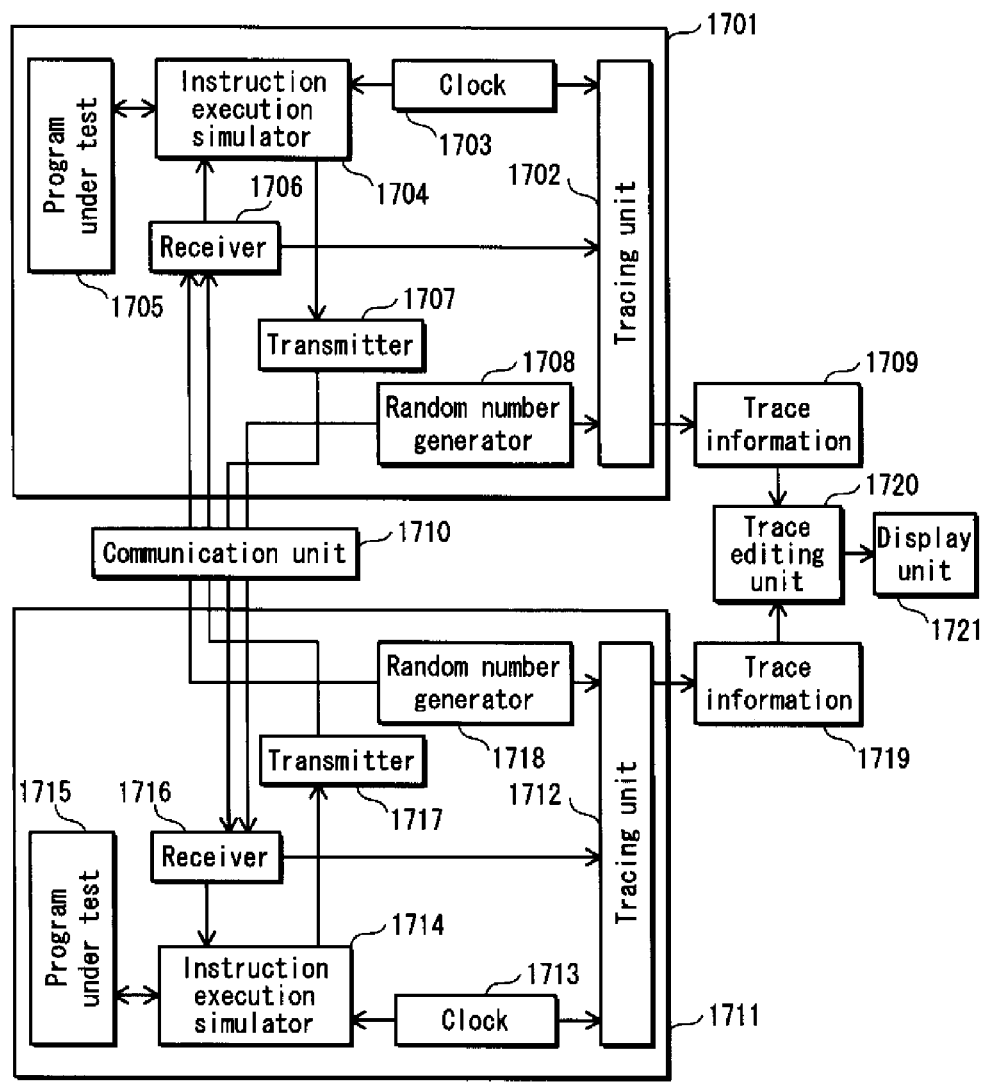
FIG. 17 is a block diagram showing the structure of a simulation apparatus for simulating operations of a conventional multiprocessor system.

FIG. 12 is a conceptual diagram of data that contains the operational information, D1a, D1b or D1c, to which the converted counter value has been added by the corresponding adding unit, 306a, 306b or 306c. In this embodiment, the operational information piece contains an operating frequency and an operating voltage.

As shown in FIG. 12, each of the adding units 306a, 306b and 306c adds the operating frequency and the operating voltage of the corresponding processing unit, 301a, 301b or 301c to the corresponding operational information piece, together with the corresponding converted counter value. Each operational information piece contains sets of items, such as the number of processing cycles, the number of executed instructions, the number of executed calculations, the cache memory hit rate and the cache memory miss rate, and the operation rates of the calculation resources. As shown in FIG. 12, a single converted counter value, #m or #m+1, is added to each set of items acquired when the corresponding operational information acquisition instruction, F1a, F1b or F1c, is issued.

Although not illustrated in FIG. 12, each of the adding units 306a, 306b and 306c adds an identifier to the converted counter value when adding the converted counter value to the operational information piece, so that the converted counter value is distinguishable from among the items in the operational information piece, including the converted counter value.

Each of the storage units 303a, 303b and 303c includes storage elements such as a memory and a register, and stores therein the operational information piece and the converted counter value. The operational information and the converted counter value stored in each of the storage units 303a, 303b and 303c are written by the corresponding adding unit, 306a, 306b or 306c. The operational information and the converted counter value stored in each of the storage units 303a, 303b and 303c is read by a read unit 1300 before the corresponding adding unit, 306a, 306b or 306c, overwrites them with new operational information and a new converted counter value. The read unit 1300 stores the operational information pieces and the converted counter values read from the storage units 303a, 303b and 303c into the external storage unit 1400 that is provided outside the parallel processing apparatus 100. The storage units 303a, 303b and 303c are provided with read signal input ports 303a1, 303b1 and 303c1 and operational information output ports 303a2, 303b2 and 303c2, respectively. Each of the read signal input ports 303a1, 303b1 and 303c1 is a port to which a read signal that requests for reading of the operational information and the converted counter value is input from the read unit 1300. Each of the operational information output ports 303a2, 303b2 and 303c2 is a port from which the operational information and the converted counter value are output in response to the input of the read signal. The read unit 1300 and the storage units 303a, 303b and 303c are connected via a plurality of signal lines, which include signal lines for transmitting the read signals from the read unit 1300 and signal lines for transmitting data such as the operational information pieces and the converted counter values output from the storage units 303a, 303b and 303c. The read unit 1300 reads the operational information pieces and the converted counter values from the storage units 303a, 303b and 303c by issuing read requests to the storage units 303a, 303b and 303c.

<2> Operations

The following explains the operations of the tracing apparatus pertaining to the present embodiment.

The processing units 301a, 301b and 301c perform data processing in synchronization with clocks CLa, CLb and CLc provided from the clock generation unit 1200, respectively. These clocks have frequencies that are different from each other. While performing the data processing, each of the processing units 301a, 301b and 301c outputs the corresponding operational information piece, D1a, D1b or D1c, to the corresponding adding unit, 306a, 306b or 306c.

Here, the operating frequency control unit 1100 calculates an optimum operating frequency for each of the processing units 301a, 301b and 301c and an optimum value of the operating voltage, Va, Vb or Vc, for each of the processing apparatuses, based on the operational information piece output from the corresponding processing unit 301a, 301b, or 301c. The operating frequency control unit 1100 changes the operating frequencies of the clock signals CLa, CLb and CLc, input to the processing units 301a, 301b and 301c, to the obtained optimum values, respectively. Also, the operating frequency control unit 1100 changes the operating voltages of the processing apparatus to the obtained optimum values. The operating frequency control unit 1100 generates operating frequency information and outputs it to the operating frequency changing unit 800. The operating frequency information includes processing unit IDs for identifying the processing units 301a, 301b and 301c and the required operating frequencies of the processing units 301a, 301b and 301c.

The operating frequency changing unit 800 receives the operating frequency information of the processing units 301a, 301b and 301c from the operating frequency control unit 1100. Then, the operating frequency changing unit 800 changes the contents of the operating frequency management table stored in the operating frequency storage unit 200, based on the received operating frequency information. Also, the operating frequency changing unit 800 outputs operating frequency change information 801 to each of the processing units 301a, 301b and 301c. The operating frequency change information notifies that the operating frequency of the clock signal to be input to the corresponding processing unit, 301a, 301b or 301c, has been changed.

On receipt of the operating frequency change information 801 from the operating frequency changing unit 800, each of the changed counter value storage units 308a, 308b and 308c stores the converted counter values obtained through the conversion of the counter value output from the corresponding counting unit, 302a, 302b or 302c, by the corresponding counter value conversion unit, 305a, 305b or 305c, before the operating frequency control unit 1100 changes the operating frequencies of the clock signals to be input to the corresponding processing unit, 301a, 301b or 301c.

Meanwhile, each of the counting units 302a, 302b and 302c starts counting the clock CLa, CLb or CLc provided to the corresponding processing unit 301a, 301b or 301c when the processing unit receives the counting start signal from the counting control unit. Then, each counting unit, 302a, 302b or 302c, outputs its counter value to the corresponding counter value conversion unit, 305a, 305b or 305c.

On receipt of the counter value from the corresponding counting unit, 302a, 302b or 302c, each of the counter value conversion units 305a, 305b and 305c calculates a conversion coefficient by dividing the operating frequency of the corresponding processing unit, 301a, 301b or 301c, acquired from the operating frequency storage unit 200, by the reference operating frequency determined and set by the reference operating frequency setting unit 400. Then, each of the counter value conversion units 305a, 305b and 305c multiplies the counter value output from the corresponding counting unit, 302a, 302b or 302c, by the corresponding conversion coefficient, and outputs the multiplication result as a converted counter value to the corresponding adding unit, 306a, 306b or 306c.

Each of the adding units 306a, 306b and 306c adds the converted counter value received from the corresponding counter value conversion unit, 305a, 305b or 305c, to the operational information piece received from the corresponding processing unit 301a, 301b or 301c. In this way, each of the adding units 306a, 306b and 306c writes the operational information piece and the converted counter value into the corresponding storage unit, 303a, 303b or 303c.

The operational information and the converted counter value stored in each of the storage units 303a, 303b and 303c is read by the read unit 1300 before the corresponding adding unit, 306a, 306b or 306c, overwrites them with new operational information and a new converted counter value.

The read unit 1300 stores the operational information pieces and the converted counter values read from the storage units into the external storage unit 1400 that is provided outside the parallel processing apparatus 100.

<Modifications>

(1) In Embodiment 1 above, it is the control apparatus provided outside the parallel processing apparatus 100 that sets the reference operating frequency to the reference operating frequency setting unit 400. However, the present invention is not limited to this. For example, the reference operating frequency setting unit 400 may automatically obtain the operating frequency of one of the processing units 301a, 301b and 301c based on the ID of the processing unit shown in the operating frequency management table, and determines and sets the operating frequency as the reference operating frequency.

In this modification, it is unnecessary for the user to set the reference operating frequency, because the reference operating frequency setting unit 400 automatically determines and sets the operating frequency of one of the processing units 301a, 301b and 301c as the reference operating frequency. This improves the convenience.

In this embodiment, when the operating frequencies of the processing units 301a, 301b and 301c are fixed to certain values, the operating frequency storage unit 200 may be omitted. If this is the case, the counter value conversion unit 305a, 305b and 305c may prestore the operating frequencies of the processing units 301a, 301b and 301c, respectively, as the fixed values.

(2) In Embodiment 1 described above, the adding units 306a, 306b and 306c add the converted counter values discretely to the operational information pieces, as shown in FIG. 4. However, the present invention is not limited to this. For example, the converted counter values may be added sequentially to the items in the operational information pieces, as shown in FIG. 13. If this is the case, on receipt of the operational information acquisition instruction, F1a, F1b or F1c, from the corresponding operational information acquisition timing control unit, 307a, 307b or 307c, each of the adding units 306a, 306b and 306c acquires a single item of the operational information piece from the corresponding processing unit and a converted counter value from the corresponding counter value processing unit, 305a, 305b or 305c, and adds the converted counter value to the item of the operational information piece. After that, for each cycle specified by the reference operating frequency, each of the adding units 306a, 306b and 306c acquires a single item of the operational information piece from the corresponding processing unit and a converted counter value from the corresponding counter value conversion unit, 305a, 305b or 305c, and adds the converted counter value to the item of the operational information. In other words, each of the adding units 306a, 306b and 306c adds the converted counter values to the items of the operational information on a one-to-one basis.

In this modification, it is unnecessary to add identifiers to the converted counter values to make them distinguishable from containing the converted counter values, because the converted counter values are added to the items of the operational information on a one-to-one basis. This simplifies the processing by the adding units 306a, 306b and 306c. Also, this structure is applicable to the cases where it is desired to acquire sequential logs in a certain period, such as execution history of instructions and calculations, and access history showing accesses to addresses in the memory.

(3) Embodiments 1, 2 and 4 each show an examples in which the operational information acquisition timing control units 307a, 307b and 307c output the operational information acquisition instructions F1a, F1b and F1c to the adding units 306a, 306b and 306c, respectively when the counter value conversion units 305a, 305b and 305c output the converted counter values. However, the present invention is not limited to this. For example, the operational information acquisition timing control units 307a, 307b and 307c may not be provided. Instead, each of the adding units 306a, 306b and 306c may hold delay time information that shows a delay time from a point when the corresponding counting unit, 302a, 302b or 302c, outputs a counter value to a point when the corresponding counter value conversion unit, 305a, 305b or 305c, outputs a converted counter value. If this is the case, the acquisition of the operational information pieces from the processing units 301a, 301b and 301c and the acquisition of the converted counter values from the counter value conversion units 305a, 305b and 305c are performed when the counting units 302a, 302b and 302c output the counter values, and the converted counter values at the delay time ago are calculated, and the converted counter values are added to the operational information pieces.

If the point when the counter value conversion units 305a, 305b and 305c outputs a converted counter value is the same as, or is a negligibly-short time from the point when the corresponding counting unit, 302a, 302b or 302c, outputs a counter value, each of the adding units 306a, 306b and 306c may acquire operational information piece from the corresponding processing unit 301a, 301b or 301c and converted counter values from the corresponding counter value conversion unit 305a, 305b or 305c, and add the converted counter values to the operational information.

(4) As shown in FIG. 9, Embodiment 3 described above shows an example in which the counter values are discretely added to the items in the operational information pieces. However, the present invention is not limited to this. For example, as shown in FIG. 14, the counter values may be added sequentially to the items in the operational information pieces. If this is the case, on receipt of the operational information acquisition instruction, F1a, F1b or F1c, from the corresponding operational information acquisition timing control unit, 307a, 307b or 307c, each of the adding units 306a, 306b and 306c acquires a single item of the operational information piece from the corresponding processing unit and a counter value from the corresponding counting unit, 302a, 302b or 302c, and adds the counter value to the item of the operational information piece. Subsequently, each of the adding units 306a, 306b and 306c, in each cycle specified by the operating frequency of the corresponding processing unit, 301a, 301b, or 301c, acquires a single item of the operational information piece from the processing unit and the counter value from the corresponding counting unit, 302a, 302b or 302c when the corresponding operational information acquisition instruction, F1a, F1b or F1c, occurs, and adds the counter value to the item of the operational information piece. In other words, each of the adding units 306a, 306b and 306c adds the counter values to the items of the operational information on a one-to-one basis. This modification supports the cases where it is desired that the sequential logs relating to the change history of the operating frequency or the operating voltage.

(5) In Embodiment 4 described above, the adding units 306a, 306b and 306c add the converted counter values discretely to the operational information pieces, as shown in FIG. 12. However, the present invention is not limited to this. For example, the converted counter values, the operating frequencies and the operating voltages may be added sequentially to the items in the operational information pieces, as shown in FIG. 15. If this is the case, on receipt of the operational information acquisition instruction, F1a, F1b or F1c, from the corresponding operational information acquisition timing control unit, 307a, 307b or 307c, each of the adding units 306a, 306b and 306c acquires a single item of the operational information piece from the corresponding processing unit and a converted counter value from the corresponding counter value processing unit, 305a, 305b or 305c, and adds the converted counter value to the item of the operational information piece. After that, for each cycle specified by the reference operating frequency, each of the adding units 306a, 306b and 306c acquires a single item of the operational information piece from the corresponding processing unit and a converted counter value from the corresponding counter value conversion unit, 305a, 305b or 305c, and adds the converted counter value to the item of the operational information. In other words, each of the adding units 306a, 306b and 306c adds the converted counter values to the items of the operational information on a one-to-one basis. This modification supports the cases where it is desired that the sequential logs relating to the change history of the operating frequency or the operating voltage.

(6) The components of the tracing apparatuses 101, 102 and 103 in the Embodiments 1-4 may be integrated and realized as single or plural LSIs (Large Scale Integration). Also, each component may be realized as single LSI. In other words, in each of Embodiments 1, 2 and 4, the processing units 301a, 301b and 301c, the counting units 302a, 302b and 302c, the counter value conversion units 305a, 305b and 305c and the adding units 306a, 306b and 306c may be replaced with an integrated circuit that includes counterpart circuits having the same functions, namely, a processing circuit, a counter circuit, a counter value conversion circuit, and an adding circuit. Also, in Embodiment 3, the processing units 301a, 301b and 301c, the counting units 302a, 302b and 302c, and the adding units 306a, 306b and 306c may be replaced with an integrated circuit that includes counterpart circuits having the same functions, namely, a processing circuit, a counter circuit, and an adding circuit.

This modification can be realized as a small entity because the parallel processing apparatus and the tracing apparatus are realized with single integrated circuit.

(7) In Embodiments 1, 2 and 4 described above, each of the counter value conversion units 305a, 305b and 305c may be realized by execution of software on the hardware that constitutes the processing apparatuses, and the processing units 301a, 301b and 301c may be provided with the counting start signals or the counting stop signals on the software at the same time. In such a case, if the clock signals to be input to the processing units 301a, 301b and 301c are generated by dividing, with a divider, an output from single frequency synthesizer for each of the processing units, the counting start signals and the counting stop signals may be generated based on the clock signals input to the processing units 301a, 301b and 301c on the software.

(8) In Embodiments 1 and 4 described above, the read unit 1300 may be provided in a plurality so as to connect to each of the storage units 303a, 303b and 303c, and each reads the operational information piece and the converted counter value from the corresponding storage units, 303a, 303b or 303c, with the operating frequency of the corresponding processing unit, 301a, 301b or 301c. Alternatively, the read unit may read the operational information pieces and the converted counter values from the storage units 303a, 303b and 303c with a constant frequency higher than any of the operating frequencies of the processing units 301a, 301b and 301c.

(9) Embodiments 2 and 3 described above each show an example in which the operational information acquisition unit 601 is realized with the processor and the like included in the operational information editing apparatus 600. However, the present invention is not limited to this. The operational information acquisition unit 601 may be realized with a processor or the like provided within the parallel processing apparatus 100.

(10) In Embodiments 2 and 3, the monitor may be displayed with graphical information such as waveforms and graphs, and texts such as numeric values indicating the operational information pieces.

(11) Embodiment 1 shows an example in which each of the counting units 302a, 302b and 302c starts the counting on detection of the falling edge of the counting start signal. However, the present invention is not limited to this. For example, each counting unit may start the counting on detection of the rising edge of the counting start signal. Alternatively, each counting unit may start the counting on detection of that the level of the counting start signal reaches a predetermined value.

(12) Embodiments 1-4 each show an example in which the operational information and the converted counter value stored in each of the storage units 303a, 303b and 303c is read by the read unit 1300 before the corresponding adding unit, 306a, 306b or 306c, overwrites them with new operational information and a new converted counter value. However, the present invention is not limited to this. For example, the read unit 1300 may be provided with a setting unit (not illustrated) which enables the user to set the timing of reading the operational information pieces and the converted counter values, flexibly.

<Supplemental Descriptions>

The LSI explained in Modification (6) may be referred to as an IC (Integrated Circuit), a VLSI (Very Large Scale Integration), an SLSI (Super Large Scale Integration), or a ULSI (Ultra Large Scale Integration), depending on the degree of integration.

Also, the method of integration may be realized by a dedicated circuit or a general-purpose processor. It is possible to use a FPGA (Field Programmable Gate Array) that is programmable even after it has been manufactured, or a reconfigurable processor in which the connection and settings of circuit cells in the LSI can be restructured.

INDUSTRIAL APPLICABILITY

The present invention is applicable for realizing tracing on a plurality of processing units included in a parallel processing apparatus with reference to the same timeline, in order to analyze the performance and the operations of the parallel processing apparatus in a time sequence. The present invention is also applicable for conducting time-series analysis on the operations of the parallel processing apparatus including a plurality of processing units whose operating frequencies and operating voltages change dynamically.

REFERENCE SIGNS LIST

100: parallel processing apparatus
101, 102, 103: tracing apparatus
200, 603: operating frequency storage unit
301a, 301b, 301: processing unit
302a, 302b, 302c: counting unit
303a, 303b, 303c: storage unit
305a, 305b, 305c, 605: counter value conversion unit 306a, 306b, 306c: adding unit
307a, 307b, 307c: operational information acquisition timing control unit
308a, 308b, 308c: changed counter value storage unit
309: counting control unit
400, 604: reference operating frequency setting unit
600: operational information editing apparatus
601: operational information acquisition unit
602: time-information associating unit
606: edition-use storage unit
607: counter value extracting unit
700: monitor
701: display control apparatus
800: operating frequency changing unit
801: operating frequency change information
900: operating voltage
1000: user interface
1100: operating frequency control unit
1200: clock generation unit
CLa, CLb, CLc: clock signal
D1a, D1b, D1c: operational information piece
F1a, F1b, F1c: operational information acquisition instruction
Va, Vb, Vc: operating voltage

The invention claimed is:

1. A tracing apparatus for tracing operational information that is output from a plurality of processing units in relation to data processing operations, the tracing apparatus comprising for each of the processing units:
   a counting unit configured to obtain and output a counter value for the corresponding processing unit, the counter value obtained by counting clock signals that are input to the processing unit at an operating frequency thereof;
   a counter value conversion unit configured to obtain and output a converted counter value for the corresponding processing unit, the converted counter value obtained by converting the counter value based on the assumption that the processing unit has a given reference operating frequency; and
   an adding unit configured to acquire an operational information set from the corresponding processing unit, and to add the converted counter value to the operational information set.

2. The tracing apparatus of claim 1 further comprising:
   a counting control unit configured to control each of the counting units such that the counting units start counting the clock signals at the same time.

3. The tracing apparatus of claim 1 further comprising:
   an operating frequency storage unit configured to store operating frequencies of the processing units, wherein
   each of the counter value conversion units acquires an operating frequency of the corresponding processing unit from the operating frequency storage unit.

4. The tracing apparatus of claim 3 further comprising:
   a reference operating frequency setting unit configured to set the reference operating frequency to each of the counter value conversion units, wherein
   each of the counter value conversion units obtains the converted counter value by using the operating frequency of the corresponding processing unit and the reference operating frequency.

5. The tracing apparatus of claim 4, wherein
   the reference operating frequency setting unit selects one from among the operating frequencies of the processing units as the reference operating frequency.

6. The tracing apparatus of claim 5, wherein
   each of the counter value conversion units obtains the converted counter value by multiplying the counter value by a conversion coefficient obtained by dividing the reference operating frequency by the operating frequency of the corresponding processing unit.

7. The tracing apparatus of claim 3 further comprising:
   an operating frequency changing unit configured to update the operating frequencies in the operating frequency storage unit when the operating frequency of any of the processing units is changed.

8. The tracing apparatus of claim 7, wherein
   each of the adding units adds the operating frequency of the corresponding processing unit to the operational information set together with the converted counter value.

9. The tracing apparatus of claim 3 further comprising:
   a storage unit configured to store each of the operational information sets with the corresponding converted counter value added.

10. The tracing apparatus of claim 9 further comprising:
    a reference operating frequency setting unit configured to set the reference operating frequency to each of the counter value conversion units, wherein
    each of the counter value conversion units obtains the converted counter value by using the operating frequency of the corresponding processing unit and the reference operating frequency.

11. The tracing apparatus of claim 10, wherein
    the reference operating frequency setting unit selects one from among the operating frequencies of the processing units as the reference operating frequency.

12. An integrated circuit including a plurality of processing circuits that each output operational information sets relating to data processing operations, the integrated circuit comprising for each of the processing circuits:
    a counter circuit configured to obtain and output a counter value for the corresponding processing circuit, the counter value obtained by counting clock signals that are input to the processing circuit at an operating frequency thereof;
    a counter value conversion circuit configured to obtain and output a converted counter value for the corresponding processing circuit, the converted counter value obtained by converting the counter value based on the assumption that the processing circuit has a given reference operating frequency; and
    an adding circuit configured to acquire an operational information set from the corresponding processing circuit, and add the converted counter value to the operational information set.

13. A tracing system that includes a tracing apparatus and an operational information editing apparatus, and traces operational information that is output from a plurality of processing units in relation to data processing operations,
    the tracing apparatus comprising for each of the processing units:
    a counting unit configured to obtain and output counter values for the corresponding processing unit, the counter values obtained by counting clock signals that are input to the processing unit at an operating frequency thereof;
    a counter value conversion unit configured to obtain and output converted counter values for the corresponding processing unit, the converted counter values obtained by converting the counter values based on the assumption that the processing unit has a given reference operating frequency; and an adding unit configured to acquire operational information sets from the corresponding processing unit, and add the converted counter values to the operational information sets on a one-to-one basis, and the editing apparatus comprising:

an operational information acquiring unit configured to acquire data containing the operational information sets and the converted counter values from the tracing apparatus; and a time-information associating unit configured to associate, for each of the processing units, the operational information sets with the converted counter values by using the converted counter values as time points at which the corresponding processing unit acquires the operational information sets, and to sort, for each of the processing units, the operational information sets in the order of the converted counter values.

14. A tracing system that includes a tracing apparatus and an operational information editing apparatus, and traces operational information that is output from a plurality of processing units in relation to data processing operations, the tracing apparatus comprising for each of the processing units:

a counting unit configured to obtain and output counter values for the corresponding processing unit, the counter values obtained by counting clock signals that are input to the processing unit at an operating frequency thereof; and an adding unit configured to acquire an operational information set from the corresponding processing unit each time the counting unit outputs a counter value, and add the counter values to the acquired operational information sets on a one-to-one basis, and the editing apparatus comprising:

an operational information acquiring unit configured to acquire data containing the operational information sets and the counter values from the tracing apparatus;

a counter value extracting unit configured to extract the counter values for each of the processing units, from the data acquired by the operational information acquiring unit;

a counter value conversion unit configured to obtain and output converted counter values for each of the processing units, each converted counter value obtained by converting the corresponding counter value based on the assumption that the processing unit has a given reference operating frequency; and a time-information associating unit configured to associate, for each of the processing units, the operational information sets with the converted counter values by using the converted counter values as time points at which the corresponding processing unit acquires the operational information sets, and to sort, for each of the processing units, the operational information sets in the order of the converted counter values.

15. A tracing method for tracing operational information that is output from a plurality of processing units in relation to data processing operations, the tracing method comprising, for each of the processing units, the steps of:

obtaining and outputting a counter value for the corresponding processing unit, the counter value obtained by counting clock signals that are input to the processing unit at an operating frequency thereof;

obtaining and outputting a converted counter value for the corresponding processing unit, the converted counter value obtained by converting the counter value based on the assumption that the processing unit has a given reference operating frequency; and acquiring an operational information set from the corresponding processing unit, and adding the converted counter value to the operational information set.

* * * * *